(12) United States Patent
Soltani et al.

(10) Patent No.: US 11,678,285 B2
(45) Date of Patent: Jun. 13, 2023

(54) SYNCHRONIZATION SIGNAL BLOCK DESIGN USING A SINGLE CARRIER QUADRATURE AMPLITUDE MODULATION WAVEFORM

(71) Applicant: QUALCOMM Incorporated, San Diego, CA (US)

(72) Inventors: Morteza Soltani, San Diego, CA (US); Jun Ma, San Diego, CA (US); Xiaoxia Zhang, San Diego, CA (US); Iyab Issam Sakhnini, San Diego, CA (US); Tao Luo, San Diego, CA (US); Juan Montojo, San Diego, CA (US); Peter Gaal, San Diego, CA (US); Raviteja Patchava, San Diego, CA (US); Hemant Saggar, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 17/443,879

(22) Filed: Jul. 28, 2021

(65) Prior Publication Data
US 2023/0036387 A1     Feb. 2, 2023

(51) Int. Cl.
*H04W 56/00* (2009.01)
*H04L 5/00* (2006.01)

(52) U.S. Cl.
CPC ....... *H04W 56/0015* (2013.01); *H04L 5/0051* (2013.01); *H04W 56/003* (2013.01); *H04W 56/0035* (2013.01)

(58) Field of Classification Search
CPC ... H04L 5/0001; H04L 5/0007; H04L 5/0044; H04L 5/0048; H04L 5/005; H04L 5/0051; H04L 5/12; H04W 56/0015; H04W 56/003; H04W 56/0035
See application file for complete search history.

(56) References Cited

U.S. PATENT DOCUMENTS

| | | | | |
|---|---|---|---|---|
| 2020/0267674 | A1* | 8/2020 | Ji | H04W 56/001 |
| 2020/0295896 | A1* | 9/2020 | Xiong | H04L 27/2636 |
| 2020/0313835 | A1* | 10/2020 | Ji | H04L 5/0044 |
| 2021/0083911 | A1* | 3/2021 | Morozov | H04L 27/2014 |
| 2022/0123979 | A1* | 4/2022 | Liu | H04L 27/2607 |
| 2022/0232493 | A1* | 7/2022 | Harada | H04W 72/0406 |
| 2022/0271983 | A1* | 8/2022 | Ma | H04L 27/26025 |

* cited by examiner

*Primary Examiner* — Pao Sinkantarakorn
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive a synchronization signal block (SSB) transmitted using a single carrier quadrature amplitude modulation (SC-QAM) waveform, wherein the SSB has a uniform bandwidth allocation for each of a primary synchronization signal (PSS) included in the SSB, a secondary synchronization signal (SSS) included in the SSB, and physical broadcast channel (PBCH) data included in the SSB. The UE may perform initial channel access based at least in part on the SSB. Numerous other aspects are described.

30 Claims, 14 Drawing Sheets

SYNCHRONIZATION SIGNAL BLOCK DESIGN USING A SINGLE CARRIER QUADRATURE AMPLITUDE MODULATION WAVEFORM

FIELD OF THE DISCLOSURE

Aspects of the present disclosure generally relate to wireless communication and to techniques and apparatuses for synchronization signal block design using a single carrier quadrature amplitude modulation waveform.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a synchronization signal block (SSB) transmitted using a single carrier quadrature amplitude modulation (SC-QAM) waveform, wherein the SSB has a uniform bandwidth allocation for each of a primary synchronization signal (PSS) included in the SSB, a secondary synchronization signal (SSS) included in the SSB, and physical broadcast channel (PBCH) data included in the SSB. The method may include performing initial channel access based at least in part on the SSB.

Some aspects described herein relate to a method of wireless communication performed by a base station. The method may include transmitting an SSB using an SC-QAM waveform, wherein the SSB has a uniform bandwidth allocation for each of a PSS included in the SSB, an SSS included in the SSB, and PBCH data included in the SSB. The method may include performing initial channel access based at least in part on the SSB.

Some aspects described herein relate to a UE for wireless communication. The UE may include a memory and one or more processors coupled to the memory. The one or more processors may be configured to receive an SSB transmitted using an SC-QAM waveform, wherein the SSB has a uniform bandwidth allocation for each of a PSS included in the SSB, an SSS included in the SSB, and PBCH data included in the SSB. The one or more processors may be configured to perform initial channel access based at least in part on the SSB.

Some aspects described herein relate to a base station for wireless communication. The base station may include a memory and one or more processors coupled to the memory. The one or more processors may be configured to transmit an SSB using an SC-QAM waveform, wherein the SSB has a uniform bandwidth allocation for each of a PSS included in the SSB, an SSS included in the SSB, and PBCH data included in the SSB. The one or more processors may be configured to perform initial channel access based at least in part on the SSB.

Some aspects described herein relate to a non-transitory computer-readable medium that stores a set of instructions for wireless communication by a UE. The set of instructions, when executed by one or more processors of the UE, may cause the UE to receive an SSB transmitted using an SC-QAM waveform, wherein the SSB has a uniform bandwidth allocation for each of a PSS included in the SSB, an SSS included in the SSB, and PBCH data included in the SSB. The set of instructions, when executed by one or more processors of the UE, may cause the UE to perform initial channel access based at least in part on the SSB.

Some aspects described herein relate to a non-transitory computer-readable medium that stores a set of instructions for wireless communication by a base station. The set of instructions, when executed by one or more processors of the base station, may cause the base station to transmit an SSB using an SC-QAM waveform, wherein the SSB has a uniform bandwidth allocation for each of a PSS included in the SSB, an SSS included in the SSB, and PBCH data included in the SSB. The set of instructions, when executed by one or more processors of the base station, may cause the base station to perform initial channel access based at least in part on the SSB.

Some aspects described herein relate to an apparatus for wireless communication. The apparatus may include means for receiving an SSB transmitted using an SC-QAM waveform, wherein the SSB has a uniform bandwidth allocation for each of a PSS included in the SSB, an SSS included in the SSB, and PBCH data included in the SSB. The apparatus may include means for performing initial channel access based at least in part on the SSB.

Some aspects described herein relate to an apparatus for wireless communication. The apparatus may include means for transmitting an SSB using an SC-QAM waveform, wherein the SSB has a uniform bandwidth allocation for each of a PSS included in the SSB, an SSS included in the SSB, and PBCH data included in the SSB. The apparatus may include means for performing initial channel access based at least in part on the SSB.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
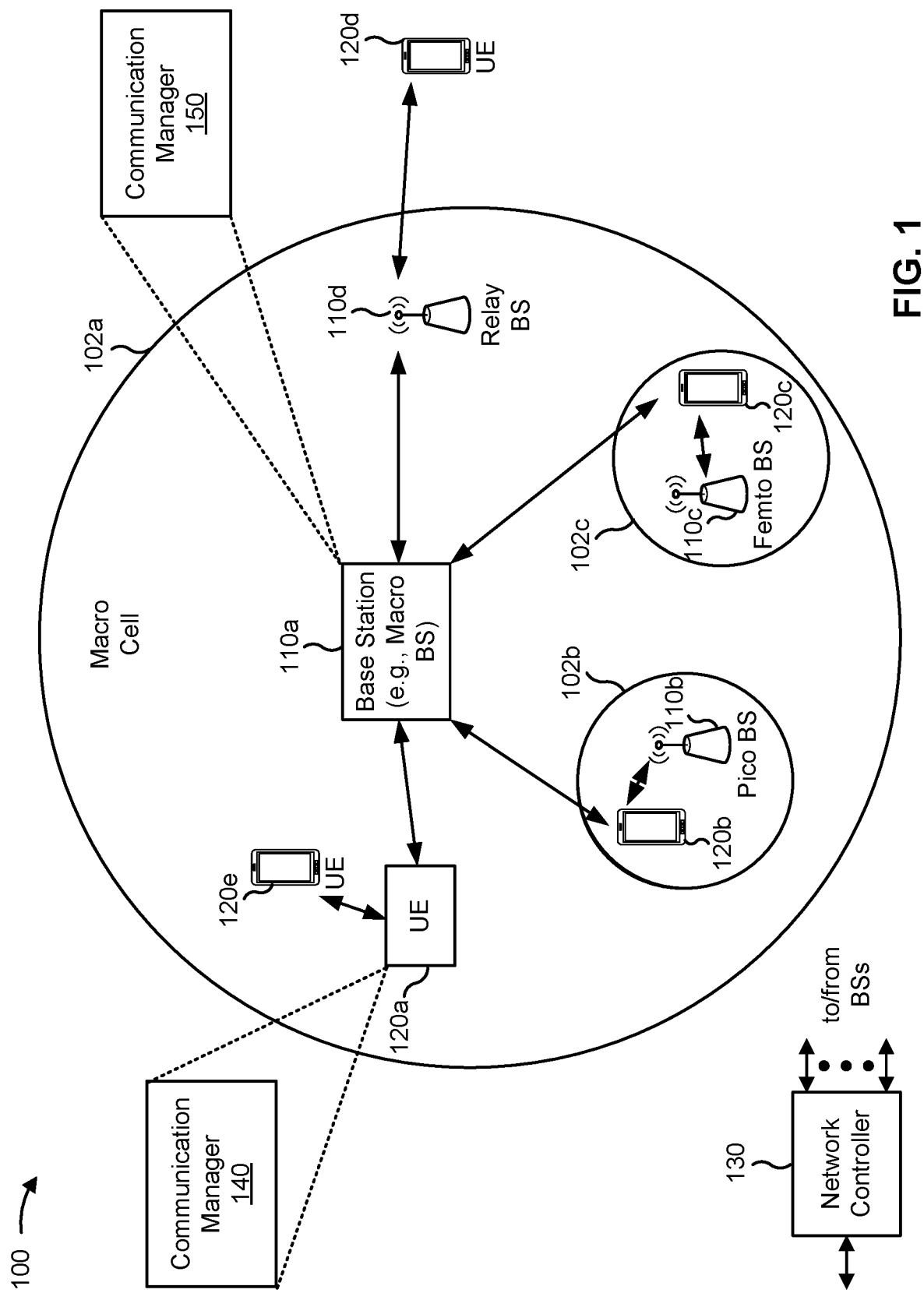
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peerto-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a synchronization signal block (SSB) transmitted using a single carrier quadrature amplitude modulation (SC-QAM) waveform, wherein the SSB has a uniform bandwidth allocation for each of a primary synchronization signal (PSS) included in the SSB, a secondary synchronization signal (SSS) included in the SSB, and physical broadcast channel (PBCH) data included in the SSB; and perform initial channel access based at least in part on the SSB. Additionally, or alternatively, the communication manager 140 may perform one or more other operations described herein.

In some aspects, the base station 110 may include a communication manager 150. As described in more detail elsewhere herein, the communication manager 150 may transmit an SSB using an SC-QAM waveform, wherein the SSB has a uniform bandwidth allocation for each of a PSS included in the SSB, an SSS included in the SSB, and PBCH data included in the SSB; and perform initial channel access based at least in part on the SSB. Additionally, or alternatively, the communication manager 150 may perform one or more other operations described herein.

As indicated above, FIG. 1 is provided as an example. Other examples may differ from what is described with regard to FIG. 1.

Figure 2:
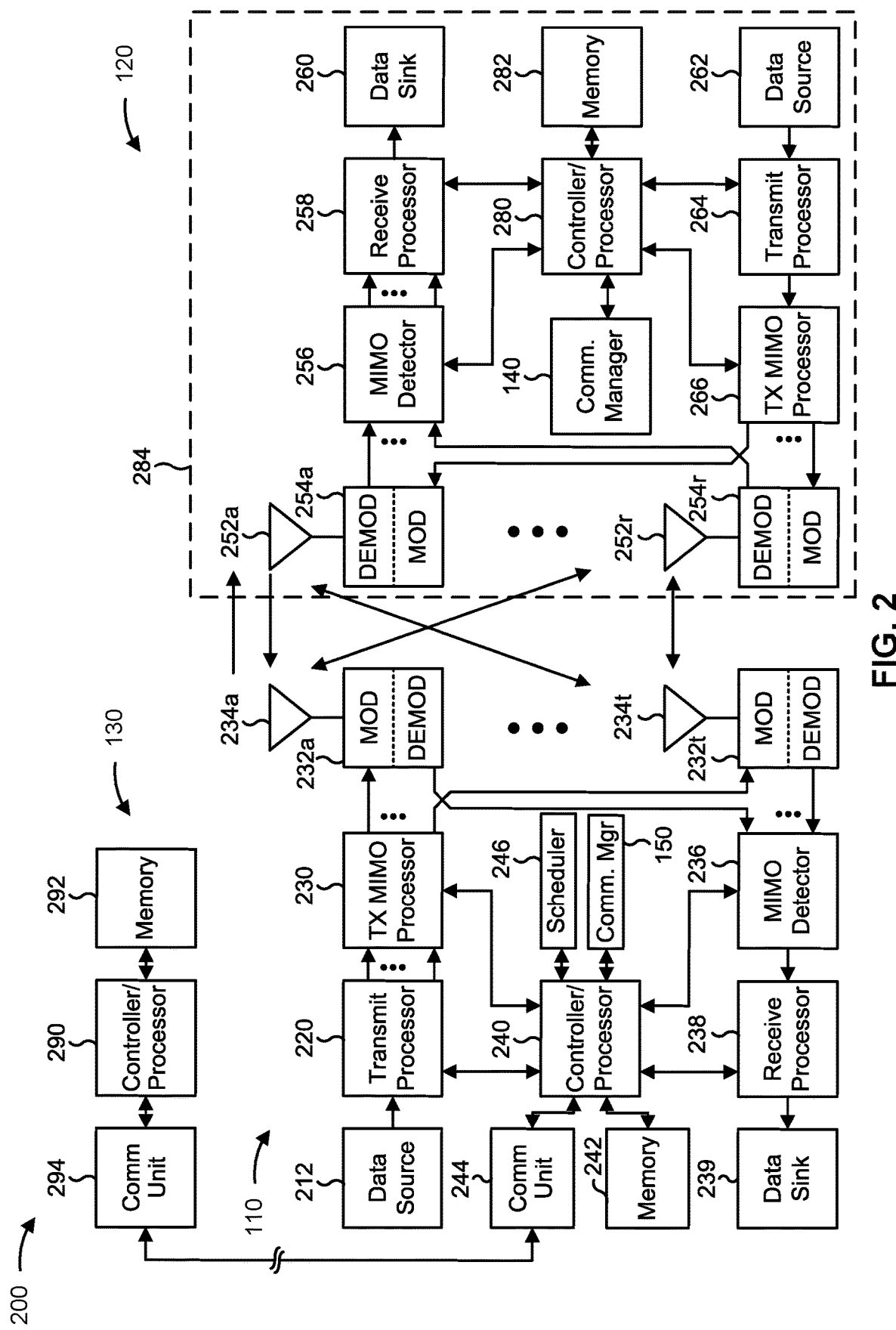
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T>1). The UE 120 may be equipped with a set of antennas 252a through 252r, such as R antennas (R>1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for discrete Fourier transform spread OFDM (DFT-s-OFDM) or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-14).

The controller/processor 240 of the base station 110, the controller/processor 280 of the UE 120, and/or any other component(s) of FIG. 2 may perform one or more techniques associated with transmission, reception, and/or processing of an SSB carried via an SC-QAM waveform, as described in more detail elsewhere herein. For example, the controller/processor 240 of the base station 110, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, the UE includes means for receiving an SSB transmitted using an SC-QAM waveform, wherein the SSB has a uniform bandwidth allocation for each of a PSS included in the SSB, an SSS included in the SSB, and PBCH data included in the SSB (e.g., using antenna 252, modem 254, MIMO detector 256, receive processor 258, controller/processor 280, memory 282, or the like); and/or means for performing initial channel access based at least in part on the SSB (e.g., using controller/processor 280, memory 282, or the like). The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting an SSB using an SC-QAM waveform, wherein the SSB has a uniform bandwidth allocation for each of a PSS included in the SSB, an SSS included in the SSB, and PBCH data included in the SSB (e.g., using controller/processor 240, transmit processor 220, TX MIMO processor 230, modem 232, antenna 234, memory 242, or the like);

and/or means for performing initial channel access based at least in part on the SSB (e.g., using controller/processor 240, memory 242, or the like). The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
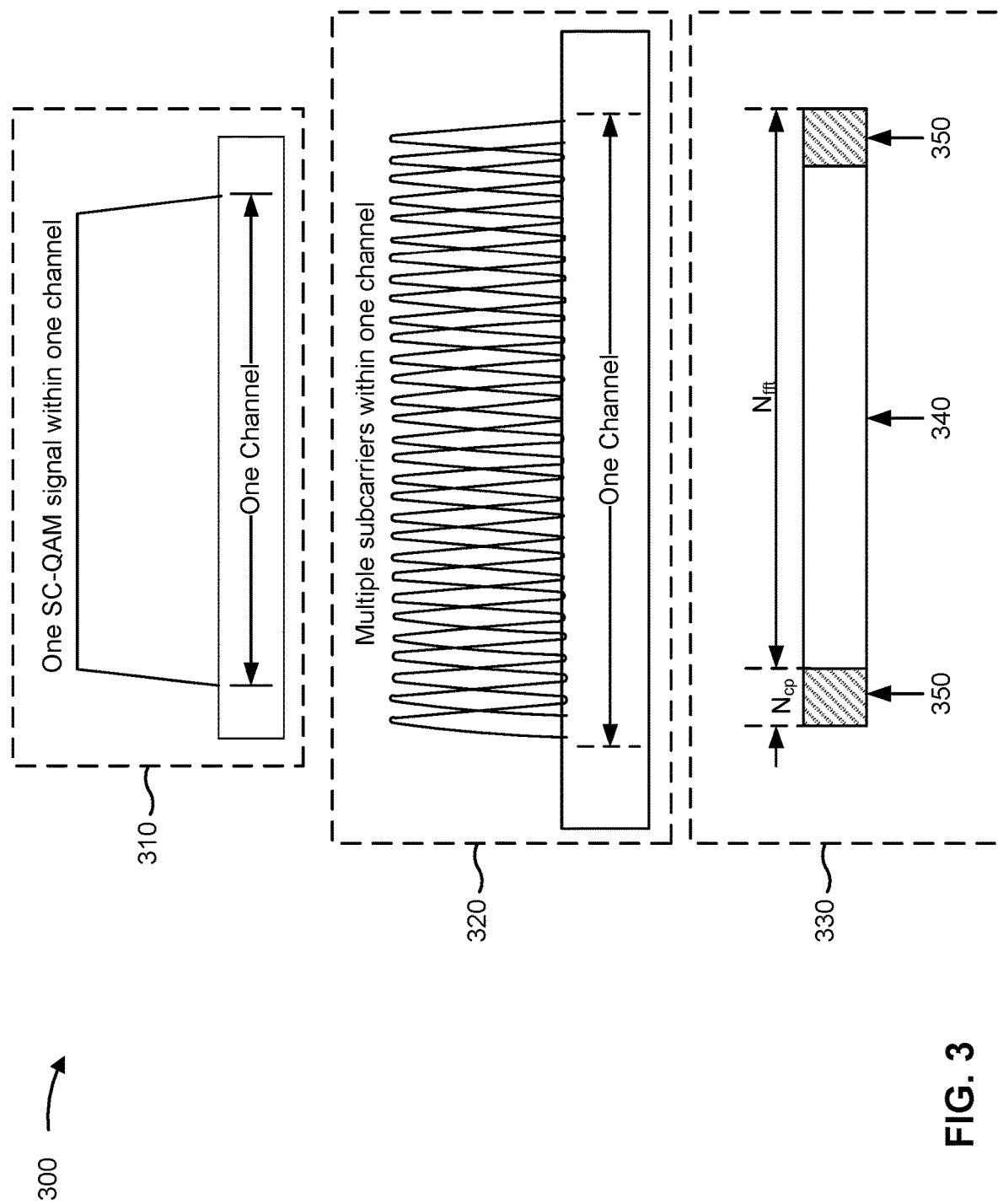
FIG. 3 is a diagram illustrating an example of a single carrier waveform and a multiple carrier waveform, in accordance with the present disclosure.

FIG. 3 is a diagram illustrating an example 300 of a single carrier waveform and a multiple carrier waveform, in accordance with the present disclosure. As shown by reference number 310, when a signal is transmitted using a single carrier waveform, the signal occupies an entire channel in the frequency domain. As shown by reference number 320, when a signal is transmitted using a multiple carrier waveform, the signal occupies a portion of the channel, such as a subcarrier within the channel. For a single carrier waveform, a time domain block (e.g., one or more symbols) may occupy the entire bandwidth to which the time domain block is assigned. For a multiple carrier waveform, a time domain block may occupy only a portion (e.g., a subcarrier) of the bandwidth to which the time domain block is assigned. A waveform may be used to transmit signals (e.g., RF signals) over the air.

An OFDM waveform is an example of a multiple carrier waveform that is used in NR (e.g., for NR downlink communications). An OFDM waveform is used, for example, in FR1 and FR2. Using an OFDM waveform results in higher spectral efficiency than a single carrier waveform (e.g., SC-QAM) because a greater number of signals can be multiplexed within a channel. However, using an OFDM waveform requires a higher amount of energy to generate, process, and transmit compared to a single carrier waveform (e.g., SC-QAM) due to frequency division multiplexing and associated signal processing (e.g., Inverse Fast Fourier Transform (IFFT) processing).

For higher band deployments (e.g., FR4, FR4-a, FR4-1, FR5, and higher), there is a large amount of radio frequency spectrum available as compared to lower band deployments (e.g., FR1, FR2, and/or FR3). This reduces the need for high spectral efficiency associated with an OFDM waveform. Thus, a single carrier waveform, such as SC-QAM, may be deployed in higher bands due to advantages associated with single carrier waveforms over OFDM, such as higher energy efficiency, longer battery life, lower peak-to-average power ratio (PAPR), and higher power amplifier efficiency.

As shown by reference number 330, an SC-QAM symbol (sometimes called an SC-QAM block) may include a data portion 340 and one or more cyclic prefix (CP) portions 350. A CP may facilitate frequency domain equalization and may make SC-QAM symbols more like OFDM symbols used in NR, which include a CP. One example of a CP is a guard interval, sometimes called a unique word. The length or duration of the SC-QAM symbol may depend on a Fast Fourier Transform (FFT) length (shown as $N_{fft}$, and sometimes called an FFT size) and/or a CP length (shown as $N_{cp}$ and sometimes called a CP size).

For higher band NR deployments (e.g., FR4, FR4-a, FR4-1, FR5, and higher), both single carrier (e.g., SC-QAM) and multiple carrier (e.g., OFDM) waveforms may be used, which introduces complexity and compatibility issues. For example, the design for SC-QAM used in higher bands should have slot-level alignment (and ideally symbol-level alignment) with OFDM. Furthermore, a common numerology between SC-QAM and OFDM would be beneficial because it would enable uniform transceiver design, such as by using the same sampling rates and/or FFT sizes for both types of waveform. Some techniques and apparatuses described herein help achieve this compatibility and reduce complexity for initial channel access using an SSB. For example, some techniques and apparatuses described herein use an SSB that has an SC-QAM waveform and that shares characteristics with SSBs having an OFDM waveform.

As indicated above, FIG. 3 is provided as an example. Other examples may differ from what is described with respect to FIG. 3.

Figure 4:
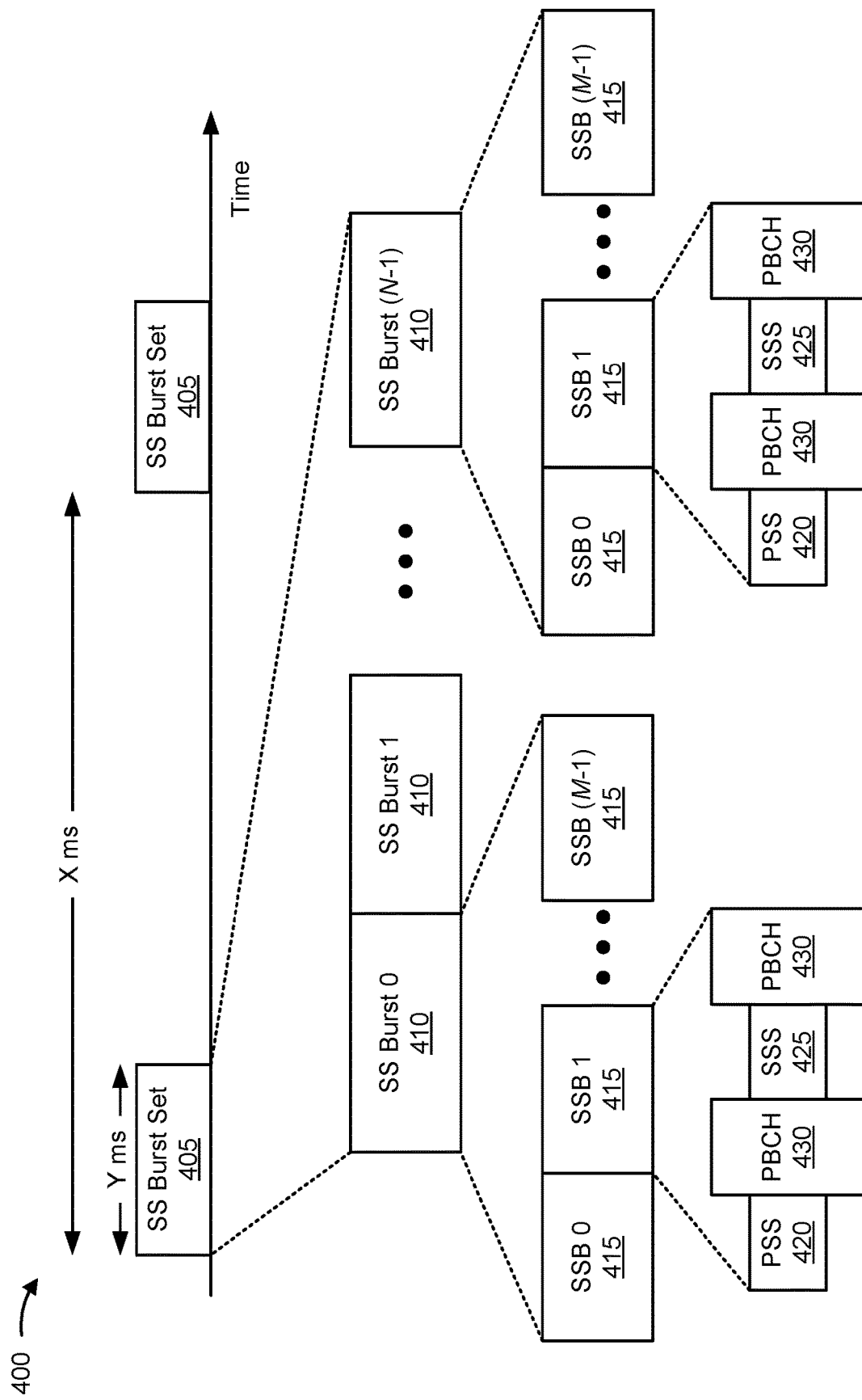
FIG. 4 is a diagram illustrating an example of a synchronization signal hierarchy, in accordance with the present disclosure.

FIG. 4 is a diagram illustrating an example 400 of a synchronization signal (SS) hierarchy, in accordance with the present disclosure. As shown in FIG. 4, the SS hierarchy may include an SS burst set 405, which may include multiple SS bursts 410, shown as SS burst 0 through SS burst N−1, where N is a maximum number of repetitions of the SS burst 410 that may be transmitted by the base station. As further shown, each SS burst 410 may include one or more SS blocks (SSBs) 415, shown as SSB 0 through SSB M−1, where M is a maximum number of SSBs 415 that can be carried by an SS burst 410. In some aspects, different SSBs 415 may be beam-formed differently (e.g., transmitted using different beams), and may be used for cell search, cell acquisition, beam management, and/or beam selection (e.g., as part of an initial network access procedure). An SS burst set 405 may be periodically transmitted by a wireless node (e.g., base station 110), such as every X milliseconds, as shown in FIG. 4. In some aspects, an SS burst set 405 may have a fixed or dynamic length, shown as Y milliseconds in FIG. 4. In some cases, an SS burst set 405 or an SS burst 410 may be referred to as a discovery reference signal (DRS) transmission window or an SSB measurement time configuration (SMTC) window.

In some aspects, an SSB 415 may include resources that carry a primary synchronization signal (PSS) 420, a secondary synchronization signal (SSS) 425, and/or a physical broadcast channel (PBCH) 430. In some aspects, multiple SSBs 415 are included in an SS burst 410 (e.g., with transmission on different beams), and the PSS 420, the SSS 425, and/or the PBCH 430 may be the same across each SSB 415 of the SS burst 410. In some aspects, a single SSB 415 may be included in an SS burst 410. In some aspects, the SSB 415 may be at least four symbols (e.g., OFDM symbols) in length, where each symbol carries one or more of the PSS 420 (e.g., occupying one symbol), the SSS 425 (e.g., occupying one symbol), and/or the PBCH 430 (e.g., occupying two symbols, or two entire symbols and a portion of another symbol shared with the SSS). In some aspects, an SSB 415 may be referred to as an SS/PBCH block.

In some aspects, the symbols of an SSB 415 are consecutive, as shown in FIG. 4. In some aspects, the symbols of an SSB 415 are non-consecutive. Similarly, in some aspects, one or more SSBs 415 of the SS burst 410 may be transmitted in consecutive radio resources (e.g., consecutive symbols) during one or more slots. Additionally, or alternatively, one or more SSBs 415 of the SS burst 410 may be transmitted in non-consecutive radio resources.

In some aspects, the SS bursts 410 may have a burst period, and the SSBs 415 of the SS burst 410 may be transmitted by a wireless node (e.g., base station 110) according to the burst period. In this case, the SSBs 415 may be repeated during each SS burst 410. In some aspects, the SS burst set 405 may have a burst set periodicity, whereby the SS bursts 410 of the SS burst set 405 are transmitted by the wireless node according to the fixed burst set periodicity. In other words, the SS bursts 410 may be repeated during each SS burst set 405.

In some aspects, an SSB 415 may include an SSB index, which may correspond to a beam used to carry the SSB 415. A UE 120 may monitor for and/or measure SSBs 415 using different receive (Rx) beams during an initial network access procedure and/or a cell search procedure, among other examples. Based at least in part on the monitoring and/or measuring, the UE 120 may indicate one or more SSBs 415 with a best signal parameter (e.g., a reference signal received power (RSRP) parameter) to a base station 110. The base station 110 and the UE 120 may use the one or more indicated SSBs 415 to select one or more beams to be used for communication between the base station 110 and the UE 120 (e.g., for a random access channel (RACH) procedure). Additionally, or alternatively, the UE 120 may use the SSB 415 and/or the SSB index to determine a cell timing for a cell via which the SSB 415 is received (e.g., a serving cell).

The SSB 415 shown in FIG. 4 has an OFDM waveform, which allows frequency division multiplexing of different portions of the SSB 415 (e.g., the PSS 420, the SSS 425, and the PBCH 430), as described in more detail below in connection with FIG. 5. Because frequency division multiplexing is not possible with an SC-QAM waveform (or other single carrier waveforms), the SSB design shown in FIG. 4 is not possible for SSBs transmitted using an SC-QAM waveform. Some techniques and apparatuses described herein use an SSB that has an SC-QAM waveform and that shares characteristics with SSBs having an OFDM waveform, such as the SSB 415 shown in FIG. 4. This may improve compatibility and reduce complexity for initial channel access when both OFDM and SC-QAM waveforms are supported for SSBs (e.g., in NR higher bands).

As indicated above, FIG. 4 is provided as an example. Other examples may differ from what is described with regard to FIG. 4.

Figure 5:
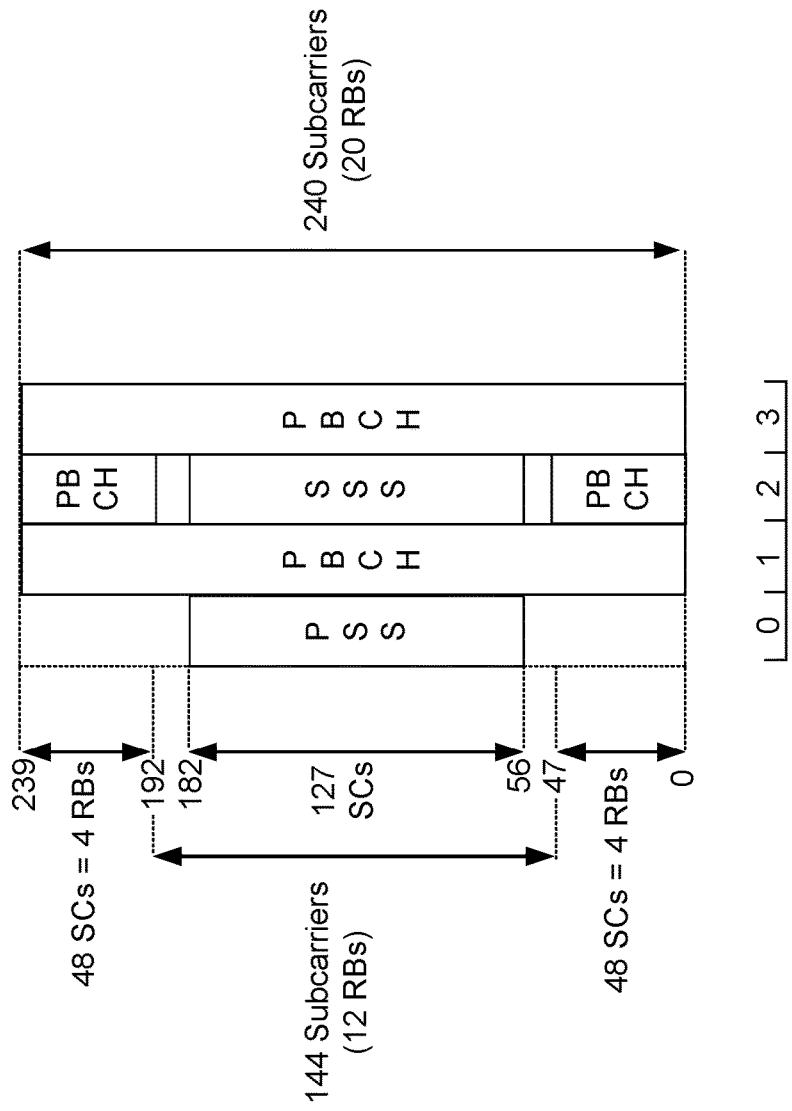
FIG. 5 is a diagram illustrating an example of a synchronization signal block (SSB) with an orthogonal frequency division multiplexing (OFDM) waveform, in accordance with the present disclosure.

FIG. 5 is a diagram illustrating an example 500 of an SSB with an OFDM waveform, in accordance with the present disclosure. As shown, for an SSB with an OFDM waveform, SSB resources (e.g., for the PSS, SSS, and PBCH) are allocated in both the time domain and the frequency domain. For example, each of the PSS, the SSS, and the PBCH occupy resource elements (REs) in multiple subcarriers. An RE is a radio resource that occupies a single subcarrier in a single symbol.

For example, and as shown, the PSS occupies the first symbol (shown as OFDM symbol 0) of the SSB in the time domain and occupies 127 subcarriers in the frequency domain, for a total of 127 REs. The SSS occupies the third symbol (shown as OFDM symbol 2) of the SSB in the time domain and occupies 127 subcarriers in the frequency domain, for a total of 127 REs. The PBCH, which includes both PBCH data and PBCH DMRSs, occupies the entire second symbol (shown as OFDM symbol 1), the entire fourth symbol (shown as OFDM symbol 3) and a portion of the third symbol of the SSB in the time domain. The PBCH occupies 240 subcarriers in the second symbol, 240 subcarriers in the fourth symbol, and 86 subcarriers in the third symbol (e.g., separated on both frequency boundaries of the SSS by gaps to reduce interference). Thus, the PBCH occupies a total of 566 REs. Of those 566 REs, 432 REs may be allocated to PBCH data, and 144 REs may be allocated to PBCH DMRSs. A PBCH DMRS may be used to estimate a radio channel to assist with demodulation of the PBCH data. The PBCH DMRS may be allocated throughout the PBCH in a frequency comb design (e.g., occupying roughly every 4 subcarriers, in some designs).

As shown, in an SSB with an OFDM waveform, the PSS and the SSS occupy different bandwidths than the PBCH. For example, the PSS and the SSS occupy 127 subcarriers, whereas the PBCH occupies 240 subcarriers in the second and fourth symbols and occupies 86 subcarriers in the third symbol. Thus, an SSB that uses an OFDM waveform has a non-uniform bandwidth allocation across time domain resources (e.g., symbols) of the SSB and has a non-uniform bandwidth allocation across portions of the SSB (e.g., the PSS, the SSS, and the PBCH, including both PBCH data and PBCH DMRS). If this design were translated to an SSB with an SC-QAM waveform, it would require different sampling rates across different time domain resources and/or portions of the SSB, which would lead to system complexity and higher design costs.

Furthermore, the SSB design shown in FIG. 5 is not possible for an SSB with an SC-QAM waveform because frequency division multiplexing of the PSS, SSS, and PBCH across different subcarriers is not possible with SC-QAM (e.g., because only a single SC-QAM signal can be transmitted in a channel). Some techniques and apparatuses described herein use time-division multiplexing (e.g., inter-symbol multiplexing and/or intra-symbol multiplexing) to multiplex PSS, SSS, and PBCH resources of an SSB transmitted using an SC-QAM waveform. However, there are a variety of options for performing this time-division multiplexing. Some techniques and apparatuses described herein enable an SSB design for SC-QAM that shares characteristics with SSBs having an OFDM waveform, thereby reducing system complexity, reducing design costs (e.g., by enabling a uniform transceiver design capable of processing both SSBs having an OFDM waveform and SSBs having an SC-QAM waveform), and improving compatibility.

As indicated above, FIG. 5 is provided as an example. Other examples may differ from what is described with respect to FIG. 5.

Figure 6:
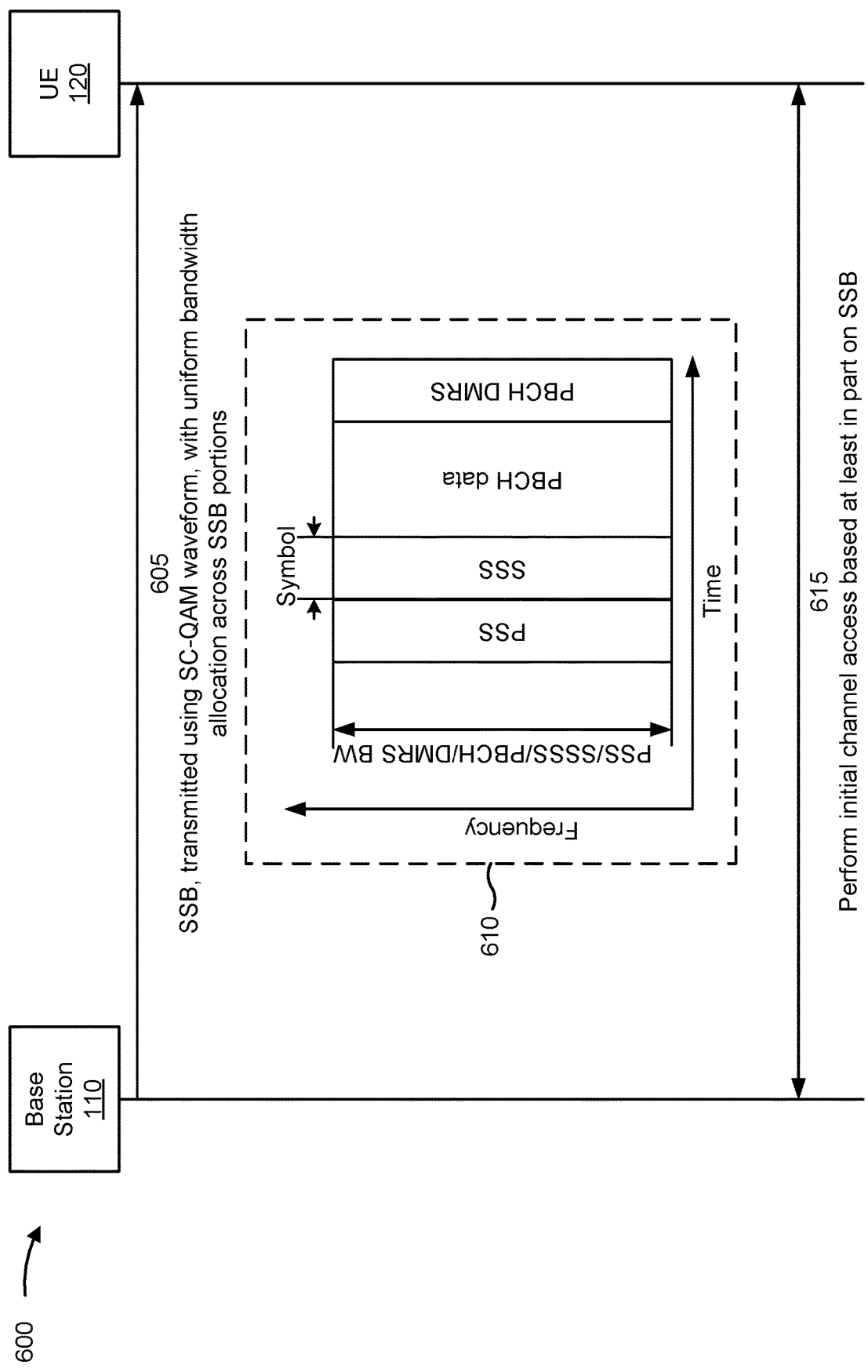
FIGS. 6-10 are diagrams illustrating examples associated with SSBs that use a single carrier quadrature amplitude modulation (SC-QAM) waveform, in accordance with the present disclosure.

FIG. 6 is a diagram illustrating an example 600 associated with SSBs that use an SC-QAM waveform, in accordance with the present disclosure. As shown in FIG. 6, a base station 110 and a UE 120 may communicate with one another.

As shown by reference number 605, the base station 110 may transmit, and the UE 120 may receive, an SSB that uses an SC-QAM waveform (or another single carrier waveform). As shown by reference number 610, the SSB may have a uniform bandwidth allocation across all portions of the SSB (e.g., all SSB resources) and/or across all symbols (or other time domain resources) of the SSB. In some aspects, and as shown in FIG. 6, the SSB includes four portions, such as a PSS (e.g., a PSS portion), an SSS (e.g., an SSS portion), PBCH data (e.g., a PBCH data portion), and PBCH DMRS (e.g., a PBCH DMRS portion). In this example, the PSS, the SSS, the PBCH data, and the PBCH DMRS may each have a uniform bandwidth allocation with one another. In this example, a set of PBCH DMRSs (e.g., carried in the PBCH DMRS) may be used as reference signals for the PBCH data, such as for channel estimation and/or for frequency error correction. In some aspects, the SSS and/or the PSS may be used as reference signals for the PBCH data in addition to the PBCH DMRS (e.g., for channel estimation and/or for frequency error correction).

For an OFDM SSB (e.g., an SSB carried using an OFDM waveform), having a non-uniform bandwidth allocation across different SSB portions (e.g., a small bandwidth allocation for the PSS and SSS as compared to the PBCH, as shown in FIG. 5) requires less UE processing for reception of the OFDM SSB as compared to a uniform bandwidth allocation because the UE does not need to monitor the full bandwidth for reception of the PSS and SSS. However, having a non-uniform bandwidth allocation across different SSB portions for an SC-QAM SSB (e.g., an SSB carried using an SC-QAM waveform) would result in more complicated UE processing for reception of the SC-QAM SSB as compared to a uniform bandwidth allocation due to, for example, different (e.g., non-uniform) sampling rates that would be required to process different SSB portions for a non-uniform bandwidth allocation SSB design. Furthermore, by using a uniform bandwidth allocation, the SSS (and, in some aspects, the PSS) can be used as a reference signal for PBCH data (e.g., as an alternative to or in addition to PBCH DMRS) because the SSS occurs in the same frequencies as the PBCH data, which may lead to better channel estimates and coverage improvements.

In some aspects, the SSB includes three portions, such as a PSS, an SSS, and PBCH data. In this example, the PSS, the SSS, and the PBCH data may each have a uniform bandwidth allocation with one another. In this example, the SSS may be used as a reference signal for the PBCH data, such as for channel estimation and/or for frequency error correction. Additionally, or alternatively, the PSS may be used as a reference signal for the PBCH data. By using the SSS (and/or the PSS) as a reference signal for the PBCH data, the SSB may exclude the PBCH DMRS, thereby freeing up resources for the PSS, the SSS, and/or PBCH data. In an SSB transmitted using an OFDM waveform, the SSS and the PSS are not used as reference signals for the PBCH data because the SSS and the PSS do not span the entire bandwidth of the SSB and thus would generate inaccurate channel estimates, at least for the portions of the PBCH data that are outside of the SSS and the PSS bandwidth.

In some aspects, when receiving an SSB transmitted by the base station 110 using an SC-QAM waveform, the UE 120 may use a uniform sampling rate across all time domain resources (e.g., all symbols) of the SSB. This uniform sampling rate may be enabled by the use of a uniform bandwidth allocation across all time domain resources of the SSB, and may reduce complexity and design costs of the UE 120. In some aspects, to improve compatibility with SSBs transmitted using an OFDM waveform and/or to reduce system complexity, the PSS may include at least 127 REs (or exactly 127 REs), the SSS may include at least 127 REs (or exactly 127 REs), and the PBCH data may include at least 432 REs (or exactly 432 REs). Using this compatible design (e.g., the same payload size for the PSS, the SSS, and the PBCH data in OFDM SSBs and SC-QAM SSBs) means that only the physical layer aspects of the SSB design are impacted, and processing of the SSB at higher layers (above the physical layer), such as a medium access control (MAC) layer, is the same regardless of the waveform type used for the SSB. In some cases, some of the information carried in the PBCH payload (e.g., a master information block, or MIB) for OFDM may not be needed for SC-QAM, such as information that indicates a subcarrier spacing (e.g., which is not relevant for SC-QAM where there is only a single carrier rather than multiple subcarriers) or a resource block index. In this case, the same PBCH data design may be used for compatibility, but the data fields or bits that are irrelevant to SC-QAM may be zeroed out by the SSB transmitter (e.g., the base station 110) and/or may be discarded by the SSB receiver (e.g., the UE 120) to reduce signal processing. Thus, in some aspects, the PBCH data for an SC-QAM SSB may include fewer than 432 REs.

As shown by reference number 615, the UE 120 and the base station 110 may perform initial channel access based at least in part on the SSB. For example, the UE 120 may monitor for and/or measure multiple SSBs, each transmitted using an SC-QAM waveform, using different Rx beams during an initial network access procedure and/or a cell search procedure, among other examples. Based at least in part on the monitoring and/or measuring, the UE 120 may indicate, to the base station 110 (e.g., in an initial channel access message), one or more SSBs with a best signal parameter (e.g., a best RSRP parameter). The base station 110 and the UE 120 may use the one or more indicated SSBs to select one or more beams to be used for communication between the base station 110 and the UE 120 (e.g., for a RACH procedure). Additionally, or alternatively, the UE 120 may use the SSB and/or an SSB index of the SSB to determine a cell timing for a cell via which the SSB is received (e.g., a serving cell of the base station 110).

Figure 7:
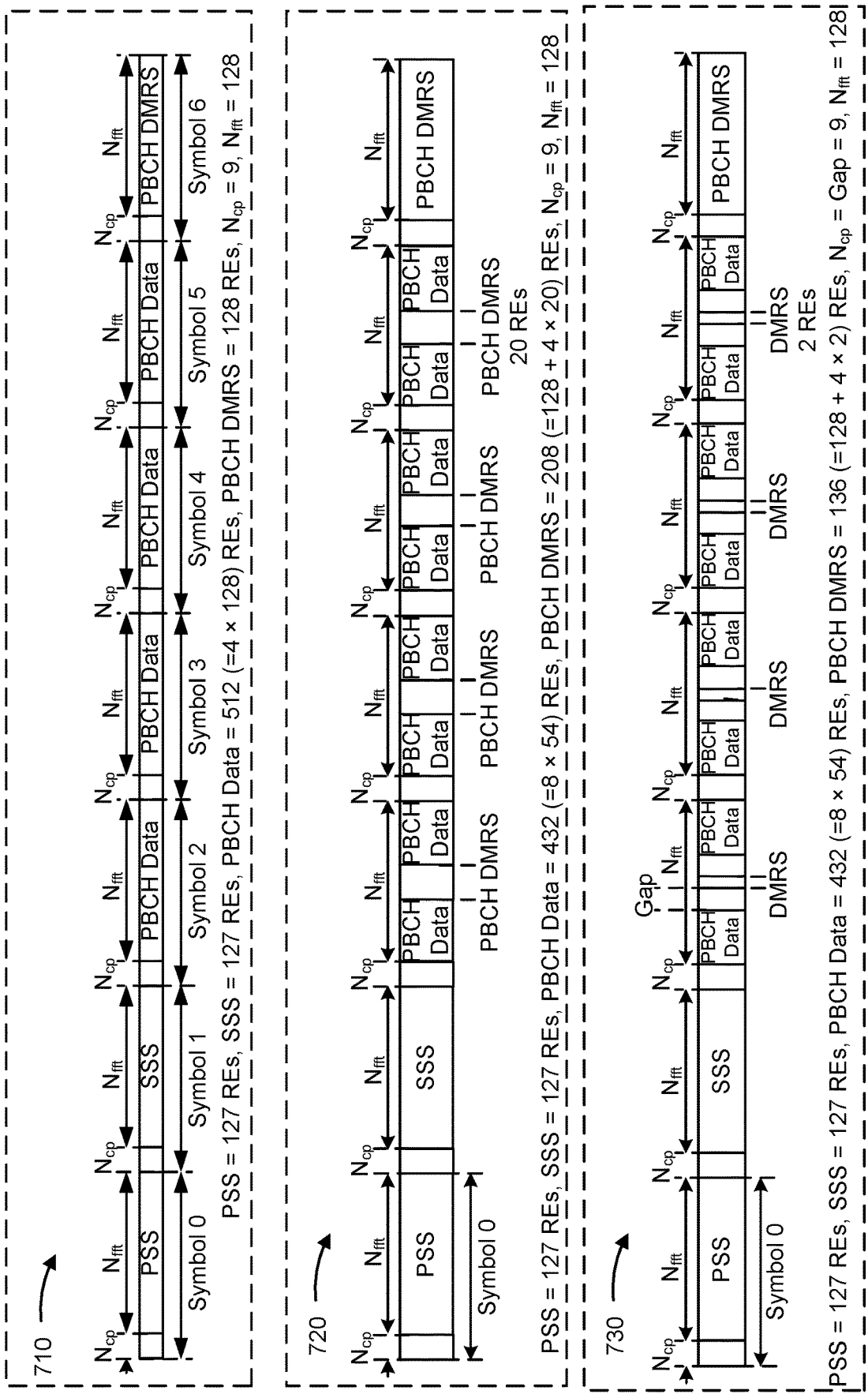
Figure 8:
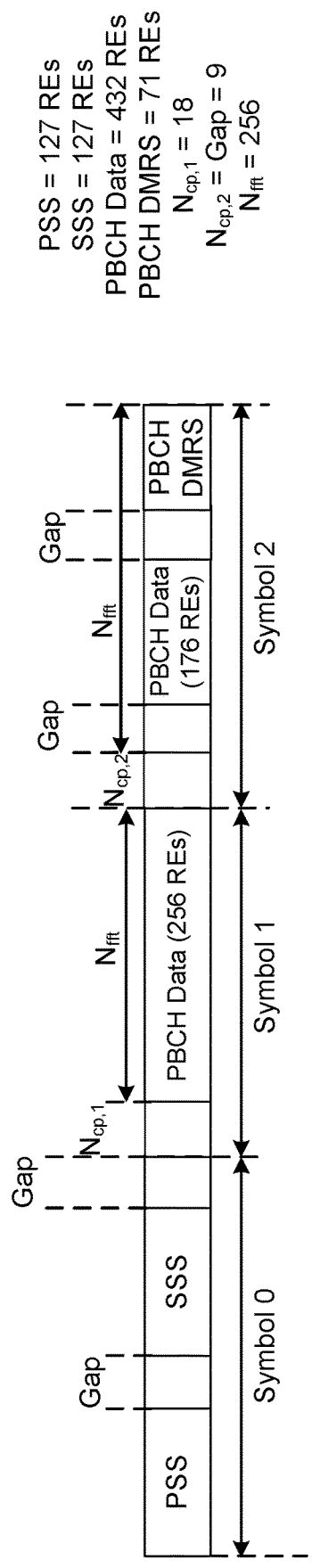
Figure 9:
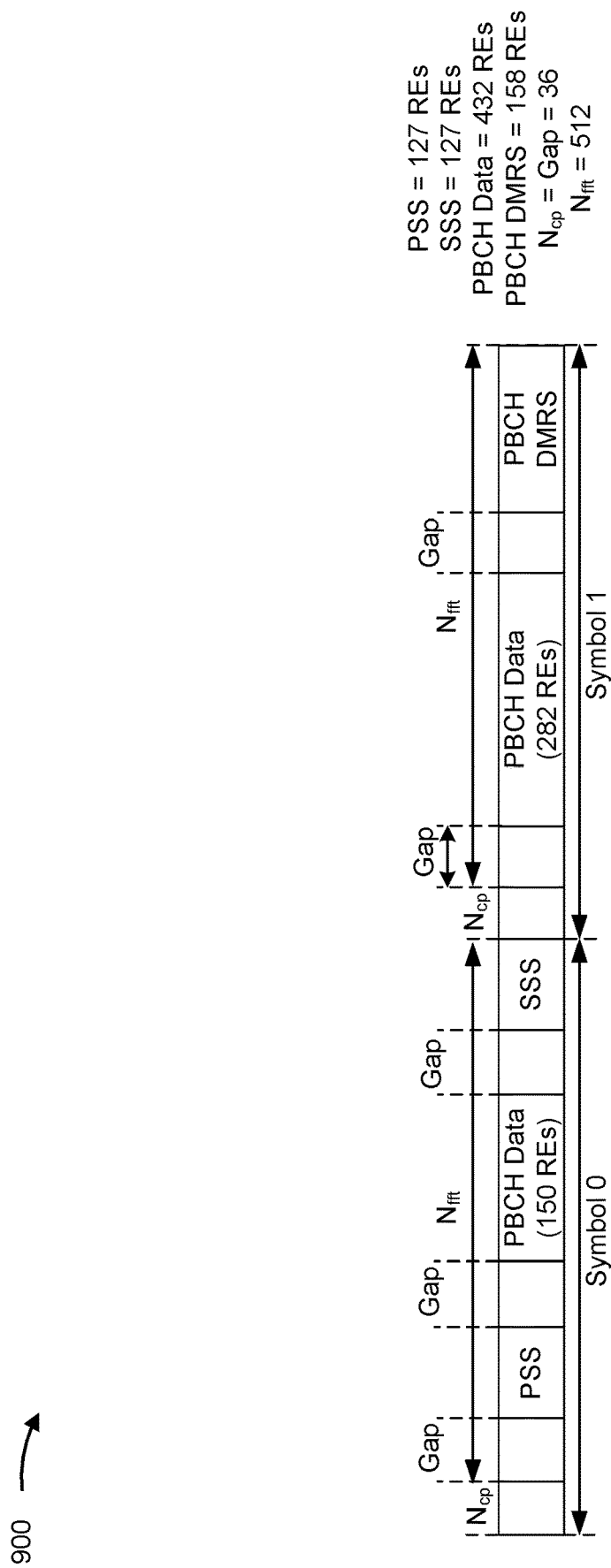
Figure 10:
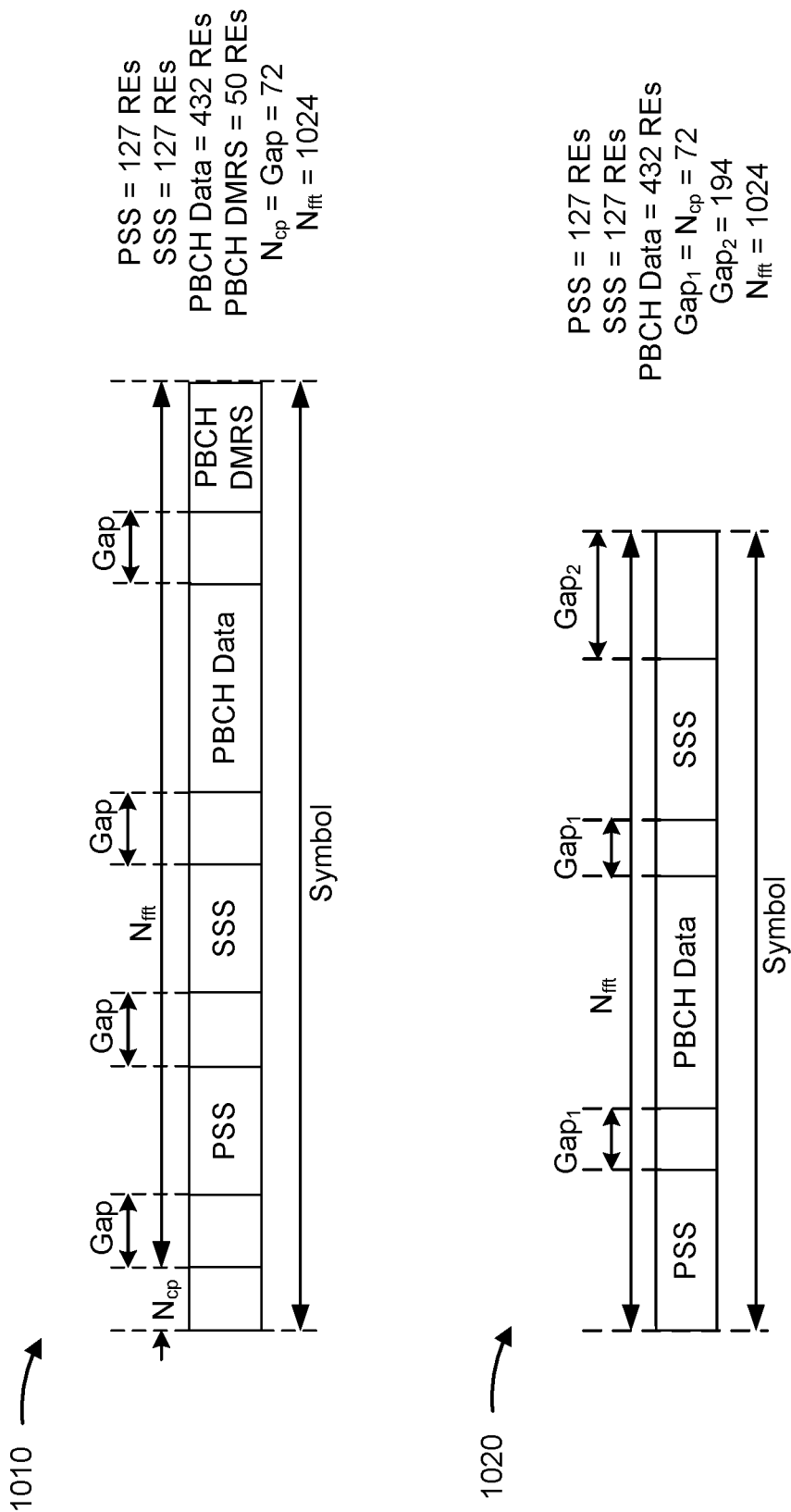

Many different designs for an SSB transmitted using an SC-QAM waveform are possible, and may depend on a numerology, a subcarrier spacing, a bandwidth, an SSB duration, and/or a synchronization raster structure used for SSBs transmitted using an SC-QAM waveform and/or transmitted in higher NR bands. FIGS. 7-10 show different time domain resource allocation options for an SSB carried using an SC-QAM waveform using a uniform bandwidth allocation. FIG. 7 shows examples of an SSB having seven symbols (or six symbols without the PBCH DMRS), FIG. 8 shows an example of an SSB having three symbols, FIG. 9 shows an example of an SSB having two symbols, and FIG. 10 shows examples of an SSB having a single symbol. In some aspects, the base station 110 may select from these designs depending on a UE capability (e.g., indicated in a UE capability report transmitted by the UE 120 to the base station 110), such as a UE capability indicating a bandwidth that the UE 120 is capable of monitoring and/or processing. Additionally, or alternatively, the base station 110 may select from these designs depending on a number of beams required or desired for beam-sweeping (e.g., in a fixed time period, such as a 20 millisecond window).

Although some aspects are described herein in connection with an SC-QAM waveform, these aspects may be applied to other types of single carrier waveforms, such as a waveform that permits only a single signal or a single carrier within a channel and/or a waveform that does not enable frequency division multiplexing (FDM). For example, the aspects described herein may be applied to a discrete Fourier transform spread OFDM (DFT-s-OFDM) waveform.

As indicated above, FIG. 6 is provided as an example. Other examples may differ from what is described with respect to FIG. 6.

FIG. 7 is a diagram illustrating a first example 710, a second example 720, and a third example 730 associated with SSBs that use an SC-QAM waveform, in accordance with the present disclosure. FIG. 7 shows examples of an SSB having seven symbols (or six symbols without PBCH DMRS). Each symbol is an SC-QAM symbol (or a symbol transmitted using another type of single carrier waveform). As described in connection with FIG. 3, each SC-QAM symbol includes a data portion and a CP portion. The length or duration of each SC-QAM symbol may depend on an FFT length or an FFT size (shown as $N_{fft}$) and a CP length or a CP size (shown as $N_{cp}$). A larger FFT size provides higher spectral resolution but takes longer to compute and requires more processing power to transmit and decode. In all of the examples shown in FIG. 7, the FFT size is 128 REs and the CP size is 9 REs (e.g., 7% CP overhead for compatibility with OFDM SSBs), for a symbol length of 137 REs.

In all of the examples shown in FIG. 7, the SSB includes one symbol that includes the PSS, one symbol that includes the SSS, four symbols that include PBCH data, and at least one symbol that includes a PBCH DMRS. Furthermore, in all of the examples shown in FIG. 7, a first-occurring symbol of the SSB (Symbol 0) includes the PSS, a second-occurring symbol of the SSB (Symbol 1) includes the SSS, and a third-occurring symbol (Symbol 2), a fourth-occurring symbol (Symbol 3), a fifth-occurring symbol (Symbol 4), and a sixth-occurring symbol (Symbol 5) of the SSB include the PBCH data. In all of the examples shown in FIG. 7, a seventh-occurring symbol (Symbol 6) of the SSB includes a PBCH DMRS. In all of the examples shown in FIG. 7, the PBCH DMRS is included in the last symbol (Symbol 6), which includes only the PBCH DMRS (and not the PSS, SSS, or PBCH data).

In the first example 710, Symbol 0 includes only the PSS, Symbol 1 includes only the SSS, Symbols 2, 3, 4, and 5 include only the PBCH data, and Symbol 6 includes only the PBCH DMRS. Thus, the first example 710 may use symbol-level multiplexing, where the PSS, the SSS, the PBCH data, and the PBCH DMRS are all carried in different symbols. In the second example 720 and the third example 730, the PBCH DMRS is included in the last symbol (Symbol 6), and is also included in each symbol that includes PBCH data (Symbols 2, 3, 4, and 5). In other words, each symbol that includes the PBCH data also includes a corresponding PBCH DMRS (e.g., in that corresponding symbol). In the second example 720, the PBCH DMRS that is included in the PBCH data symbols is not separated from the PBCH data by a gap in the time domain. A gap may include REs that have been zeroed out (e.g., zeroed out samples, blank REs, or null REs). The lack of any gaps between PBCH DMRS and PBCH data within the symbol may lead to intra-symbol interference between the PBCH DMRS and the PBCH data within the symbol. However, because SSBs do not require a high signal-to-interference-plus-noise ratio (SINR) for decoding, this intra-symbol interference may still result in acceptable decoding performance by a time domain equalizer with acceptable complexity. In the third example 730, the PBCH DMRS that is included in the PBCH data symbols is separated from the PBCH data (e.g., on both sides of the PBCH DMRS) by a gap (e.g., one or more zero bits or one or more zero or blank REs) to reduce intra-symbol interference. In other words, each PBCH DMRS that is in the same symbol as PBCH data is separated from the PBCH data (e.g., the PBCH data blocks), in that symbol, by a gap.

In all of the examples shown in FIG. 7, the PSS occupies 127 REs, the SSS occupies 127 REs, and the PBCH data occupies at least 432 REs. In some aspects, 128 REs (e.g., in the FFT length) may be set aside for each of the PSS and the SSS, and one of the 128 REs may be zeroed out (e.g., blanked) for each of the PSS and the SSS, resulting in a PSS length of 127 REs and an SSS length of 127 REs. In the first example 710, the PBCH data occupies 512 REs (e.g., 4 symbols with 128 REs in each symbol), and the PBCH DMRS occupies 128 REs. For compatibility with SSBs that use an OFDM waveform, which include 432 REs of PBCH data, 80 REs of the 512 REs of the first example 710 may be used for cyclic redundancy check (CRC) bits or another form of redundant REs. Alternatively, these 80 REs may be used for PBCH DMRS or PBCH DMRS plus gaps, as shown in connection with the second example 720 and the third example 730, respectively.

In the second example 720, the PBCH data occupies 432 REs and the PBCH DMRSs that share symbols with the PBCH data occupy 80 REs (e.g., 20 REs in each of the 4 symbols that include PBCH data), for a total of 208 REs of PBCH DMRS (e.g., 128 REs in the last symbol plus 80 REs in the shared symbols). Each symbol that includes PBCH data may include 108 REs of PBCH data (e.g., 108 REs in each of 4 symbols for a total of 432 REs). As shown in the second example 720, the PBCH DMRS may occur in the middle of each symbol that includes PBCH data (e.g., for better channel estimation of the surrounding PBCH data), resulting in 8 PBCH data blocks (e.g., that are separated from one another by either PBCH DMRS or a CP). Each of these 8 PBCH data blocks occupies 54 REs (e.g., 54 REs in each of 8 blocks for a total of 432 REs). Thus, each symbol that includes PBCH data may include (e.g., may start with) a CP of 9 REs, followed by 54 REs that carry PBCH data, followed by 20 REs that carry PBCH DMRS, followed by another 54 REs that carry PBCH data.

In the third example 730, the PBCH data occupies 432 REs in the same manner as described above in connection with the second example 720. However, the PBCH DMRSs that share symbols with the PBCH data occupy 8 REs (e.g., 2 REs in each of the 4 symbols that include PBCH data), for a total of 136 REs of PBCH DMRS (e.g., 128 REs in the last symbol plus 8 REs in the shared symbols). As shown in the second example 720, the PBCH DMRS may occur in the middle of each symbol that includes PBCH data (e.g., for better channel estimation of the surrounding PBCH data), and may be separated from the surrounding PBCH data blocks by gaps of 9 REs. Thus, each symbol that includes PBCH data may include (e.g., may start with) a CP of 9 REs, followed by 54 REs that carry PBCH data, followed by a gap of 9 REs, followed by 2 REs that carry PBCH DMRS, followed by another gap of 9 REs, followed by another 54 REs that carry PBCH data.

All of the examples of FIG. 7 show the SSB as including seven symbols with a PBCH DMRS in the seventh symbol. However, in some aspects, the SSB may include six symbols (e.g., Symbols 0 through 5 shown in FIG. 7), and may exclude the last symbol with the PBCH DMRS. Using an SSB with six symbols enables SSB beam-sweeping over a larger number of beams in a fixed time period as compared to an SSB with seven symbols. In the first example 710, but without the PBCH DMRS in the seventh symbol (and without the seventh symbol), the SSS may be used as a reference signal for the PBCH data (e.g., for channel estimation and/or for frequency error correction). Additionally, or alternatively, the PSS may be used as a reference signal for the PBCH data. However, using the SSS, rather than the PSS, as a reference signal for the PBCH data may enable more accurate determination of symbol and/or slot boundaries using the PSS. In the second example 720 and the third example 730, but without the PBCH DMRS in the seventh symbol (and without the seventh symbol), the SSS may be used as a reference signal for the PBCH data (e.g., for channel estimation and/or for frequency error correction) in addition to the PBCH DMRS carried in the symbols that include the PBCH data. This may improve channel estimation.

In the examples of FIG. 7, the relatively small FFT size of 128 REs (e.g., compared to the examples of FIGS. 8-10) requires less UE processing power for SSB decoding (e.g., as compared to the examples of FIGS. 8-10) and less bandwidth for SSB transmission. However, the relatively small FFT size also results in a greater number of symbols required to transmit the SSB (e.g., 6 or 7 symbols) as compared to the examples of FIGS. 8-10, which means that the base station 110 cannot transmit SSBs over as many beams in a fixed time period (e.g., as described above in connection with SS bursts of FIG. 4) as compared to the examples of FIGS. 8-10. Thus, the examples of FIGS. 7-10 show SSB designs with different tradeoffs in processing power and bandwidth versus beam-sweeping.

As indicated above, FIG. 7 is provided as an example. Other examples may differ from what is described with respect to FIG. 7.

FIG. 8 is a diagram illustrating an example 800 associated with SSBs that use an SC-QAM waveform, in accordance with the present disclosure. In the example 800 of FIG. 8, the SSB has three symbols. Each symbol is an SC-QAM symbol (or a symbol transmitted using another type of single carrier waveform). The length or duration of each SC-QAM symbol may depend on an FFT length or an FFT size (shown as NA, a CP length or a CP size (shown as $N_{cp,1}$ and $N_{cp,2}$), and/or a gap length or a gap size. A larger FFT size provides higher spectral resolution but takes longer to compute and requires more processing power to transmit and decode. In example 800, the FFT size is 256 REs, and each symbol has 18 REs used for a CP and/or one or more gaps (e.g., 7% overhead for compatibility with OFDM SSBs), for a symbol length of 274 REs.

In example 800, the SSB includes one symbol that includes the PSS and the SSS, one symbol that includes a first portion of the PBCH data, and one symbol that includes a PBCH DMRS and a second portion of the PBCH data. Thus, example 800 may use intra-symbol multiplexing, where the PSS and the SSS are multiplexed on the same symbol (Symbol 0), and the PBCH DMRS and a portion of the PBCH data are multiplexed on the same symbol (Symbol 2). In example 800, a first-occurring symbol of the SSB (Symbol 0) includes the PSS and the SSS, a second-occurring symbol of the SSB (Symbol 1) includes the first portion of the PBCH data, and a third-occurring symbol of the SSB (Symbol 2) includes the PBCH DMRS and the second portion of the PBCH data.

In example 800, the PSS occupies 127 REs, the SSS occupies 127 REs, the PBCH data occupies 432 REs, and the PBCH DMRS occupies 71 REs. In some aspects, 128 REs may be set aside for each of the PSS and the SSS, and one of the 128 REs may be zeroed out (e.g., blanked) for each of the PSS and the SSS, resulting in a PSS length of 127 REs and an SSS length of 127 REs. As shown, Symbol 0 includes (e.g., starts with) 128 REs set aside for the PSS (of which 1 RE is zeroed out to achieve a PSS of 127 REs for compatibility), followed by a gap of 9 REs to reduce intra-symbol interference, followed by 128 REs set aside for the SSS (of which 1 RE is zeroed out to achieve a SSS of 127 REs for compatibility), followed by another gap of 9 REs at the symbol boundary (e.g., to reduce one or both of intra-symbol interference and/or inter-symbol interference). The gap at the end of Symbol 0 may carry zeroed out REs, and thus this gap acts as a CP for Symbol 0. Also, a CP may not be needed in Symbol 0 because the detection of the PSS and the SSS with SC-QAM is performed in the time domain based at least in part on cross-correlation of the sequences received in the PSS and the SSS and known transmitted sequences.

As a result, frequency domain processing (e.g., frequency domain equalization) is not required for Symbol 0, and the CP may be omitted (or included as zeroed out samples in the gap at the end of Symbol 0).

As further shown, Symbol 1 includes a CP having a first length of 18 REs (shown as $N_{cp,1}$) followed by 256 REs that carry PBCH data. Symbol 2 includes a CP having a second length of 9 REs (shown as $N_{cp,2}$), followed by a first gap of 9 REs, followed by 176 REs that carry PBCH data, followed by a second gap of 9 REs (e.g., to reduce intra-symbol interference), followed by 71 REs that carry PBCH DMRS. The gaps in example 800 may additionally or alternatively help ensure orthogonality of different channels (e.g., a channel that carries the PSS, a channel that carries the SSS, a channel that carries the PBCH data, and/or a channel that carries the PBCH DMRS).

In example 800, in some aspects, only the PBCH DMRS is used as a reference signal for the PBCH data (e.g., for channel estimation and/or for frequency error correction). Alternatively, both the PBCH DMRS and the SSS may be used as reference signals for the PBCH data to improve channel estimation. In some aspects, the PBCH DMRS, the SSS, and/or the PSS may be used as reference signals for the PBCH data. However, using the SSS, rather than the PSS, as a reference signal for the PBCH data may enable more accurate determination of symbol and/or slot boundaries using the PSS. In some aspects, the PBCH DMRS of example 800 may be excluded from the SSB and/or may be replaced with one or more other signals, in which case the SSS and/or the PSS may be used as a reference signal for the PBCH data. For example, the PBCH DMRS REs may be replaced with redundant PBCH data REs, such as CRC REs (e.g., for improved reception of the PBCH data).

In example 800, the FFT size of 256 REs requires more UE processing power for SSB decoding and more bandwidth as compared to the examples of FIG. 7, and less UE processing power for SSB decoding and less bandwidth as compared to the examples of FIGS. 9-10. The FFT size of 256 REs also results in a smaller number of symbols required to transmit the SSB (e.g., 3 symbols) as compared to the examples of FIG. 7, which means that the base station 110 can transmit SSBs using a larger number of beams in a fixed time period (e.g., within an SS burst) as compared to the examples of FIG. 7. Notably, example 800 enables transmission of SSBs via at least 64 beams, which provides compatibility with the design for OFDM SSBs. However, example 800 does not enable beam-sweeping over as many beams as the examples of FIGS. 9-10. As described elsewhere herein, the examples of FIGS. 7-10 show SSB designs with different tradeoffs in processing power and bandwidth versus beam-sweeping.

As indicated above, FIG. 8 is provided as an example. Other examples may differ from what is described with respect to FIG. 8.

FIG. 9 is a diagram illustrating an example 900 associated with SSBs that use an SC-QAM waveform, in accordance with the present disclosure. In the example 900 of FIG. 9, the SSB has two symbols. Each symbol is an SC-QAM symbol (or a symbol transmitted using another type of single carrier waveform). The length or duration of each SC-QAM symbol may depend on an FFT length or an FFT size (shown as $N_{fft}$), a CP length or a CP size (shown as $N_{cp}$), and/or a gap length or a gap size. A larger FFT size provides higher spectral resolution but takes longer to compute and requires more processing power to transmit and decode. In example 900, the FFT size is 512 REs and the CP size is 36 REs (e.g., 7% overhead for compatibility with OFDM SSBs), for a symbol length of 548 REs. Each symbol includes one or more gaps for channel orthogonality and/or to reduce intra-symbol interference and/or to reduce inter-symbol interference.

In example 900, the SSB includes one symbol that includes the PSS, the SSS, and a first portion of the PBCH data, and the SSB includes one symbol that includes a PBCH DMRS and a second portion of the PBCH data. Thus, example 900 may use intra-symbol multiplexing, where the PSS, the SSS, and PBCH data are multiplexed on the same symbol (Symbol 0), and the PBCH DMRS and another portion of the PBCH data are multiplexed on the same symbol (Symbol 1). In example 900, a first-occurring symbol of the SSB (Symbol 0) includes the PSS, the SSS, and the first portion of the PBCH data, and a second-occurring symbol of the SSB (Symbol 1) includes the PBCH DMRS and the second portion of the PBCH data.

In example 900, the PSS occupies 127 REs, the SSS occupies 127 REs, the PBCH data occupies 432 REs, and the PBCH DMRS occupies 158 REs. As shown, Symbol 0 includes (e.g., starts with) a CP of 36 REs, followed by a gap of 36 REs, followed by 127 REs that carry the PSS, followed by another gap of 36 REs, followed by 150 REs that carry PBCH data, followed by another gap of 36 REs, followed by 127 REs that carry the SSS. Symbol 1 includes a CP of 36 REs, followed by a gap of 36 REs, followed by 282 REs that carry PBCH data, followed by another gap of 36 REs, followed by 158 REs that carry the PBCH DMRS.

In example 900, in some aspects, only the PBCH DMRS is used as a reference signal for the PBCH data (e.g., for channel estimation and/or for frequency error correction). Alternatively, both the PBCH DMRS and the SSS may be used as reference signals for the PBCH data to improve channel estimation. In some aspects, the PBCH DMRS, the SSS, and/or the PSS may be used as reference signals for the PBCH data. However, using the SSS, rather than the PSS, as a reference signal for the PBCH data may enable more accurate determination of symbol and/or slot boundaries using the PSS. In some aspects, the PBCH DMRS of example 900 may be excluded from the SSB and/or may be replaced with one or more other signals, in which case the SSS and/or the PSS may be used as a reference signal for the PBCH data. For example, the PBCH DMRS REs may be replaced with redundant PBCH data REs, a repetition of the PSS, or a repetition of the SSS, among other examples.

In example 900, the FFT size of 512 REs requires more UE processing power for SSB decoding and more bandwidth as compared to the examples of FIGS. 7-8 and less UE processing power for SSB decoding and less bandwidth as compared to the examples of FIG. 10. The FFT size of 512 REs also results in a smaller number of symbols required to transmit the SSB (e.g., 2 symbols) as compared to the examples of FIGS. 7-8, which means that the base station 110 can transmit SSBs using a larger number of beams in a fixed time period (e.g., within an SS burst) as compared to the examples of FIGS. 7-8. Notably, example 900 enables transmission of SSBs via at least 128 beams. However, example 900 does not enable beam-sweeping over as many beams as the examples of FIG. 10. As described elsewhere herein, the examples of FIGS. 7-10 show SSB designs with different tradeoffs in processing power and bandwidth versus beam-sweeping.

As indicated above, FIG. 9 is provided as an example. Other examples may differ from what is described with respect to FIG. 9.

FIG. 10 is a diagram illustrating a first example 1010 and a second example 1020 associated with SSBs that use an SC-QAM waveform, in accordance with the present disclosure. FIG. 10 shows examples of an SSB having a single symbol. The symbol is an SC-QAM symbol (or a symbol transmitted using another type of single carrier waveform). The length or duration of the SC-QAM symbol may depend on an FFT length or an FFT size (shown as $N_{fft}$) and/or a CP length or a CP size (shown as $N_{cp}$). A larger FFT size provides higher spectral resolution but takes longer to compute and requires more processing power to transmit and decode. In the examples of FIG. 10, the FFT size is 1024 REs. In the first example 1010, the CP size is 72 REs (e.g., 7% overhead for compatibility with OFDM SSBs), for a symbol length of 1096 REs. In the second example 1020, the symbol does not include a CP at the beginning on the symbol, and has a symbol length of 1024 REs. In the second example 1020, the gap at the end of the symbol may carry zeroed out REs, and thus this gap acts as a CP for the symbol. In both examples, the symbol may include one or more gaps for channel orthogonality and/or to reduce intra-symbol interference and/or to reduce inter-symbol interference.

In both of the examples shown in FIG. 10, the SSB includes a single symbol that includes the PSS, the SSS, and the PBCH data. In the first example 1010, the single symbol also includes the PBCH DMRS. In the second example 1020, the single symbol excludes the PBCH DMRS. Thus, the examples shown in FIG. 10 may use intra-symbol multiplexing, where the PSS, the SSS, and PBCH data (and the PBCH DMRS, in some aspects) are multiplexed on the same symbol. In both examples shown in FIG. 10, the PSS occupies 127 REs, the SSS occupies 127 REs, and the PBCH data occupies 432 REs. In the first example 1010, the PBCH DMRS occupies 50 REs.

In the first example 1010, the single SSB symbol includes (e.g., starts with) a CP of 72 REs, followed by a gap of 72 REs, followed by 127 REs that carry the PSS, followed by another gap of 72 REs, followed by 127 REs that carry the SSS, followed by another gap of 72 REs, followed by 432 REs that carry PBCH data, followed by another gap of 72 REs, followed by 50 REs that carry the PBCH DMRS. In some aspects, only the PBCH DMRS is used as a reference signal for the PBCH data in the first example 1010. Alternatively, both the PBCH DMRS and the SSS (and/or the PSS, in some aspects) may be used as reference signals for the PBCH data to improve channel estimation, as described elsewhere herein. In some aspects, the PBCH DMRS of the first example 1010 may be excluded from the SSB and/or may be replaced with one or more other signals, in which case the SSS and/or the PSS may be used as a reference signal for the PBCH data. For example, the PBCH DMRS REs may be replaced with redundant PBCH data REs, among other examples.

In the second example 1020, the single SSB symbol includes (e.g., starts with) 127 REs that carry the PSS, followed by a gap with a first length of 72 REs, followed by 432 REs that carry PBCH data, followed by another gap with the first length of 72 REs, followed by 127 REs that carry the SSS, followed by a gap with a second length of 194 REs. The gap at the end of the symbol may enable sufficient time for beam-switching (e.g., of a transmit beam or a receive beam) after transmission (or reception) of the illustrated SSB and prior to transmission of a subsequent SSB (e.g., in a next adjacent or contiguous symbol after the illustrated SSB). In some aspects, the SSS (and/or the PSS, in some aspects) may be used as a reference signal for the PBCH data to improve channel estimation, as described elsewhere herein.

In the examples of FIG. 10, the FFT size of 1024 REs requires more UE processing power for SSB decoding and more bandwidth as compared to the examples of FIGS. 7-9. The FFT size of 1024 REs also results in a smaller number of symbols required to transmit the SSB (e.g., 1 symbol) as compared to the examples of FIGS. 7-9, which means that the base station 110 can transmit SSBs using a larger number of beams in a fixed time period (e.g., within an SS burst) as compared to the examples of FIGS. 7-9. Thus, the examples of FIGS. 7-10 show SSB designs with different tradeoffs in processing power and bandwidth versus beam-sweeping.

As indicated above, FIG. 10 is provided as an example. Other examples may differ from what is described with respect to FIG. 10.

Figure 11:
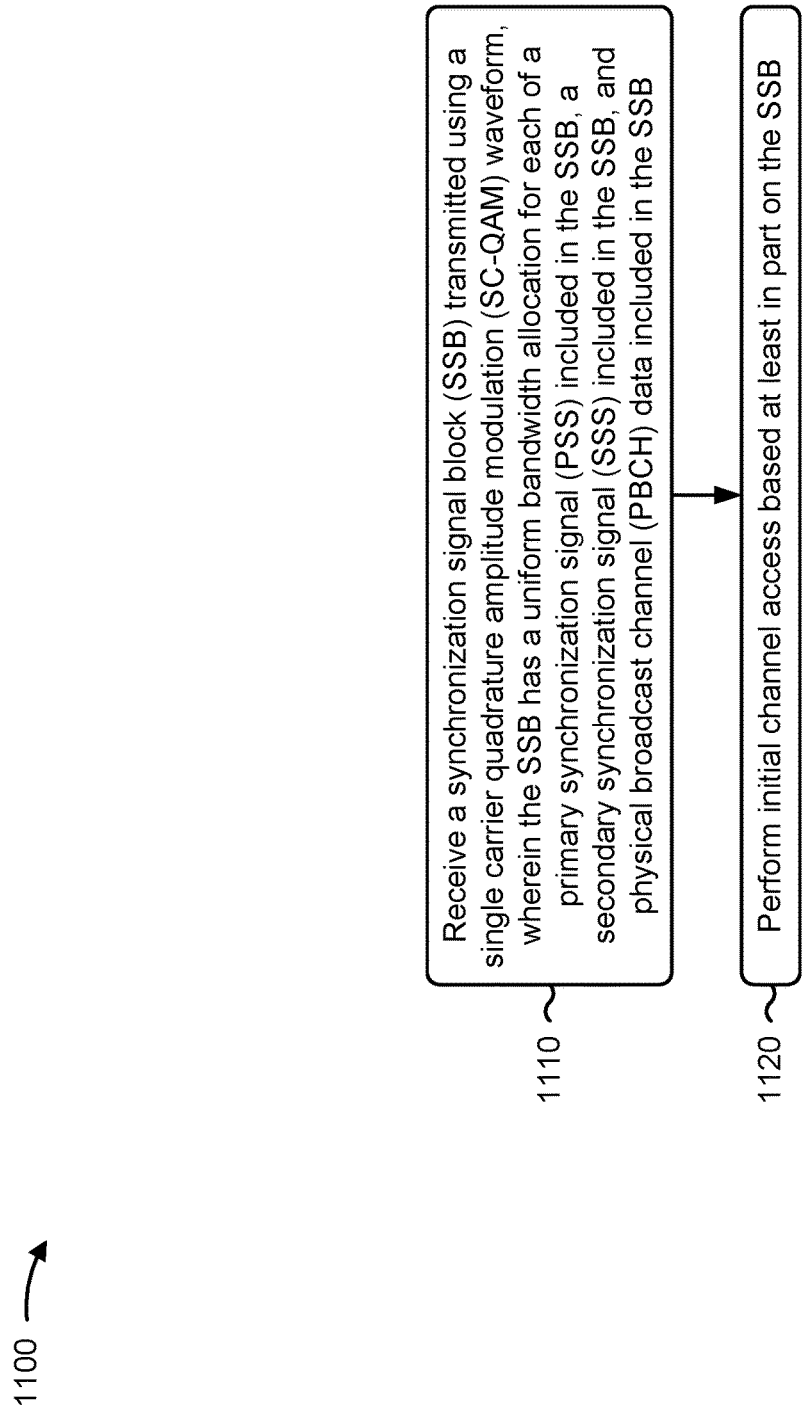
FIGS. 11-12 are diagrams illustrating example processes associated with SSBs that use an SC-QAM waveform, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with reception and/or processing of SSBs carried via an SC-QAM waveform.

As shown in FIG. 11, in some aspects, process 1100 may include receiving an SSB transmitted using an SC-QAM waveform, wherein the SSB has a uniform bandwidth allocation for each of a PSS included in the SSB, an SSS included in the SSB, and PBCH data included in the SSB (block 1110). For example, the UE (e.g., using communication manager 140 and/or reception component 1302, depicted in FIG. 13) may receive an SSB transmitted using an SC-QAM waveform, wherein the SSB has a uniform bandwidth allocation for each of a PSS included in the SSB, an SSS included in the SSB, and PBCH data included in the SSB, as described above, for example, with reference to FIGS. 6, 7, 8, 9, and/or 10.

As further shown in FIG. 11, in some aspects, process 1100 may include performing initial channel access based at least in part on the SSB (block 1120). For example, the UE (e.g., using communication manager 140 and/or channel access component 1308, depicted in FIG. 13) may perform initial channel access based at least in part on the SSB, as described above, for example, with reference to FIGS. 6, 7, 8, 9, and/or 10.

Process 1100 may include additional aspects, such as any single aspect or any combination of aspects described below and/or in connection with one or more other processes described elsewhere herein.

In a first aspect, the SSS is used as a reference signal for at least one of channel estimation for the PBCH data or frequency error correction for the PBCH data.

In a second aspect, alone or in combination with the first aspect, the SSB has a uniform bandwidth allocation for the PSS, the SSS, the PBCH data, and a PBCH DMRS included in the SSB.

In a third aspect, alone or in combination with one or more of the first and second aspects, the SSS and the PBCH DMRS are used as reference signals for at least one of channel estimation for the PBCH data or frequency error correction for the PBCH data.

In a fourth aspect, alone or in combination with one or more of the first through third aspects, the SSB includes one symbol that includes the PSS, one symbol that includes the SSS, and four symbols that include the PBCH data.

In a fifth aspect, alone or in combination with one or more of the first through fourth aspects, the SSB includes at least one symbol that includes a PBCH demodulation reference signal.

In a sixth aspect, alone or in combination with one or more of the first through fifth aspects, a first-occurring symbol of the SSB includes the PSS, a second-occurring symbol of the SSB includes the SSS, and a third-occurring symbol, a fourth-occurring symbol, a fifth-occurring symbol, and a sixth-occurring symbol of the SSB include the PBCH data.

In a seventh aspect, alone or in combination with one or more of the first through sixth aspects, a seventh-occurring symbol of the SSB includes a PBCH demodulation reference signal.

In an eighth aspect, alone or in combination with one or more of the first through seventh aspects, each of the third-occurring symbol, the fourth-occurring symbol, the fifth-occurring symbol, and the sixth-occurring symbol of the SSB includes a corresponding PBCH DMRS.

In a ninth aspect, alone or in combination with one or more of the first through eighth aspects, each corresponding PBCH DMRS is separated from PBCH data, in a corresponding symbol, by a gap.

In a tenth aspect, alone or in combination with one or more of the first through ninth aspects, the SSB includes one symbol that includes the PSS and the SSS, one symbol that includes a first portion of the PBCH data, and one symbol that includes a PBCH DMRS and a second portion of the PBCH data.

In an eleventh aspect, alone or in combination with one or more of the first through tenth aspects, a first-occurring symbol of the SSB includes the PSS and the SSS, a second-occurring symbol of the SSB includes the first portion of the PBCH data, and a third-occurring symbol of the SSB includes the PBCH DMRS and the second portion of the PBCH data.

In a twelfth aspect, alone or in combination with one or more of the first through eleventh aspects, the SSB includes one symbol that includes the PSS, the SSS, and a first portion of the PBCH data, and the SSB further includes one symbol that includes a PBCH DMRS and a second portion of the PBCH data.

In a thirteenth aspect, alone or in combination with one or more of the first through twelfth aspects, a first-occurring symbol of the SSB includes the PSS, the SSS, and the first portion of the PBCH data, and a second-occurring symbol of the SSB includes the PBCH DMRS and the second portion of the PBCH data.

In a fourteenth aspect, alone or in combination with one or more of the first through thirteenth aspects, the SSB includes a single symbol that includes the PSS, the SSS, and the PBCH data.

In a fifteenth aspect, alone or in combination with one or more of the first through fourteenth aspects, the single symbol further includes a PBCH demodulation reference signal.

In a sixteenth aspect, alone or in combination with one or more of the first through fifteenth aspects, the PSS includes at least 127 resource elements, the SSS includes at least 127 resource elements, and the PBCH data includes at least 432 resource elements.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
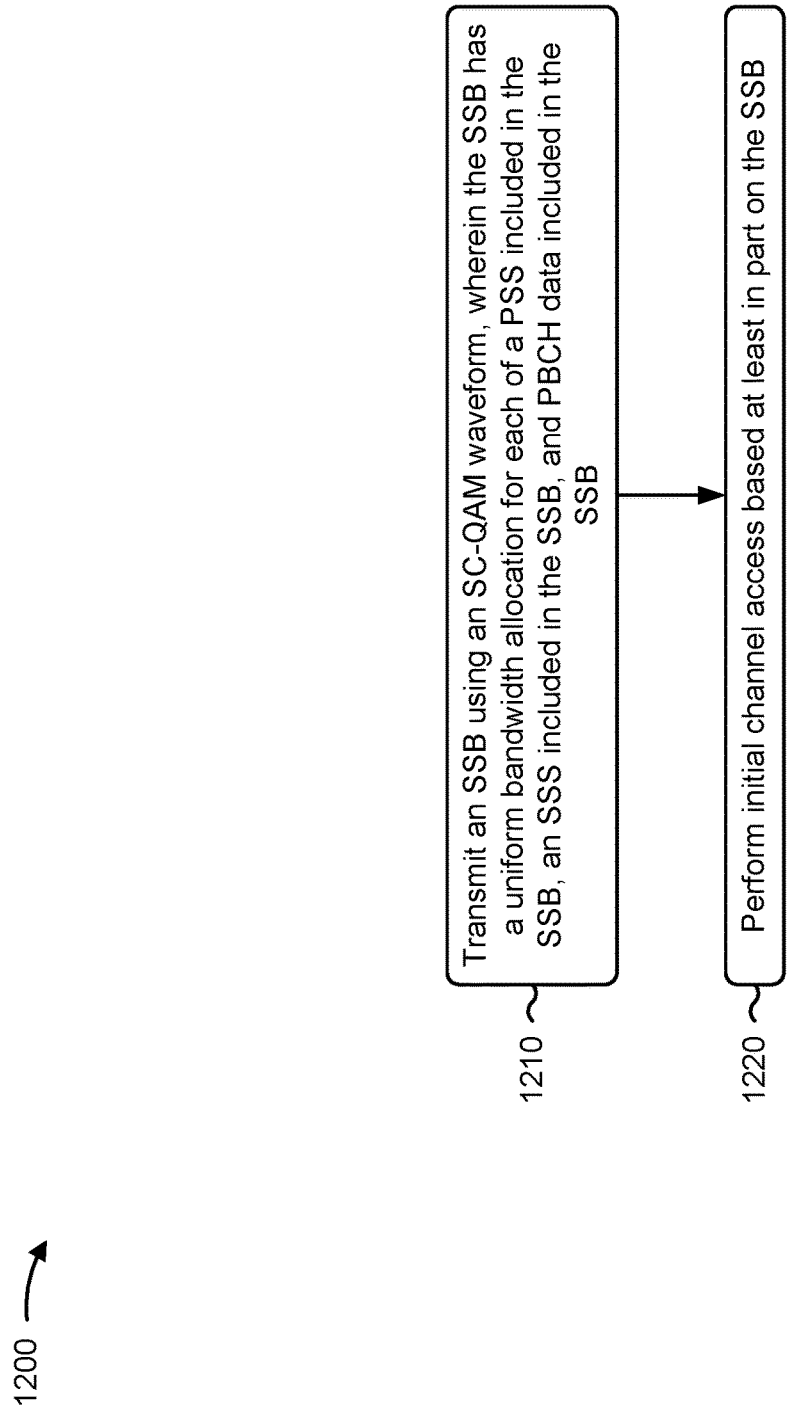

FIG. 12 is a diagram illustrating an example process 1200 performed, for example, by a base station, in accordance with the present disclosure. Example process 1200 is an example where the base station (e.g., base station 110)

performs operations associated with transmission and/or processing of SSBs carried via an SC-QAM waveform.

As shown in FIG. 12, in some aspects, process 1200 may include transmitting an SSB using an SC-QAM waveform, wherein the SSB has a uniform bandwidth allocation for each of a PSS included in the SSB, an SSS included in the SSB, and PBCH data included in the SSB (block 1210). For example, the base station (e.g., using communication manager 150 and/or transmission component 1404, depicted in FIG. 14) may transmit an SSB using an SC-QAM waveform, wherein the SSB has a uniform bandwidth allocation for each of a PSS included in the SSB, an SSS included in the SSB, and PBCH data included in the SSB, as described above, for example, with reference to FIGS. 6, 7, 8, 9, and/or 10.

As further shown in FIG. 12, in some aspects, process 1200 may include performing initial channel access based at least in part on the SSB (block 1220). For example, the base station (e.g., using communication manager 150 and/or channel access component 1408, depicted in FIG. 14) may perform initial channel access based at least in part on the SSB, as described above, for example, with reference to FIGS. 6, 7, 8, 9, and/or 10.

Process 1200 may include additional aspects, such as any single aspect or any combination of aspects described below and/or in connection with one or more other processes described elsewhere herein.

In a first aspect, the SSS is used as a reference signal for at least one of channel estimation for the PBCH data or frequency error correction for the PBCH data.

In a second aspect, alone or in combination with the first aspect, the SSB has a uniform bandwidth allocation for the PSS, the SSS, the PBCH data, and a PBCH DMRS included in the SSB.

In a third aspect, alone or in combination with one or more of the first and second aspects, the SSS and the PBCH DMRS are used as reference signals for at least one of channel estimation for the PBCH data or frequency error correction for the PBCH data.

In a fourth aspect, alone or in combination with one or more of the first through third aspects, the SSB includes one symbol that includes the PSS, one symbol that includes the SSS, and four symbols that include the PBCH data.

In a fifth aspect, alone or in combination with one or more of the first through fourth aspects, the SSB includes at least one symbol that includes a PBCH demodulation reference signal.

In a sixth aspect, alone or in combination with one or more of the first through fifth aspects, a first-occurring symbol of the SSB includes the PSS, a second-occurring symbol of the SSB includes the SSS, and a third-occurring symbol, a fourth-occurring symbol, a fifth-occurring symbol, and a sixth-occurring symbol of the SSB include the PBCH data.

In a seventh aspect, alone or in combination with one or more of the first through sixth aspects, a seventh-occurring symbol of the SSB includes a PBCH demodulation reference signal.

In an eighth aspect, alone or in combination with one or more of the first through seventh aspects, each of the third-occurring symbol, the fourth-occurring symbol, the fifth-occurring symbol, and the sixth-occurring symbol of the SSB includes a corresponding PBCH DMRS.

In a ninth aspect, alone or in combination with one or more of the first through eighth aspects, each corresponding PBCH DMRS is separated from PBCH data, in a corresponding symbol, by a gap.

In a tenth aspect, alone or in combination with one or more of the first through ninth aspects, the SSB includes one symbol that includes the PSS and the SSS, one symbol that includes a first portion of the PBCH data, and one symbol that includes a PBCH DMRS and a second portion of the PBCH data.

In an eleventh aspect, alone or in combination with one or more of the first through tenth aspects, a first-occurring symbol of the SSB includes the PSS and the SSS, a second-occurring symbol of the SSB includes the first portion of the PBCH data, and a third-occurring symbol of the SSB includes the PBCH DMRS and the second portion of the PBCH data.

In a twelfth aspect, alone or in combination with one or more of the first through eleventh aspects, the SSB includes one symbol that includes the PSS, the SSS, and a first portion of the PBCH data, and the SSB further includes one symbol that includes a PBCH DMRS and a second portion of the PBCH data.

In a thirteenth aspect, alone or in combination with one or more of the first through twelfth aspects, a first-occurring symbol of the SSB includes the PSS, the SSS, and the first portion of the PBCH data, and a second-occurring symbol of the SSB includes the PBCH DMRS and the second portion of the PBCH data.

In a fourteenth aspect, alone or in combination with one or more of the first through thirteenth aspects, the SSB includes a single symbol that includes the PSS, the SSS, and the PBCH data.

In a fifteenth aspect, alone or in combination with one or more of the first through fourteenth aspects, the single symbol further includes a PBCH demodulation reference signal.

In a sixteenth aspect, alone or in combination with one or more of the first through fifteenth aspects, the PSS includes at least 127 resource elements, the SSS includes at least 127 resource elements, and the PBCH data includes at least 432 resource elements.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
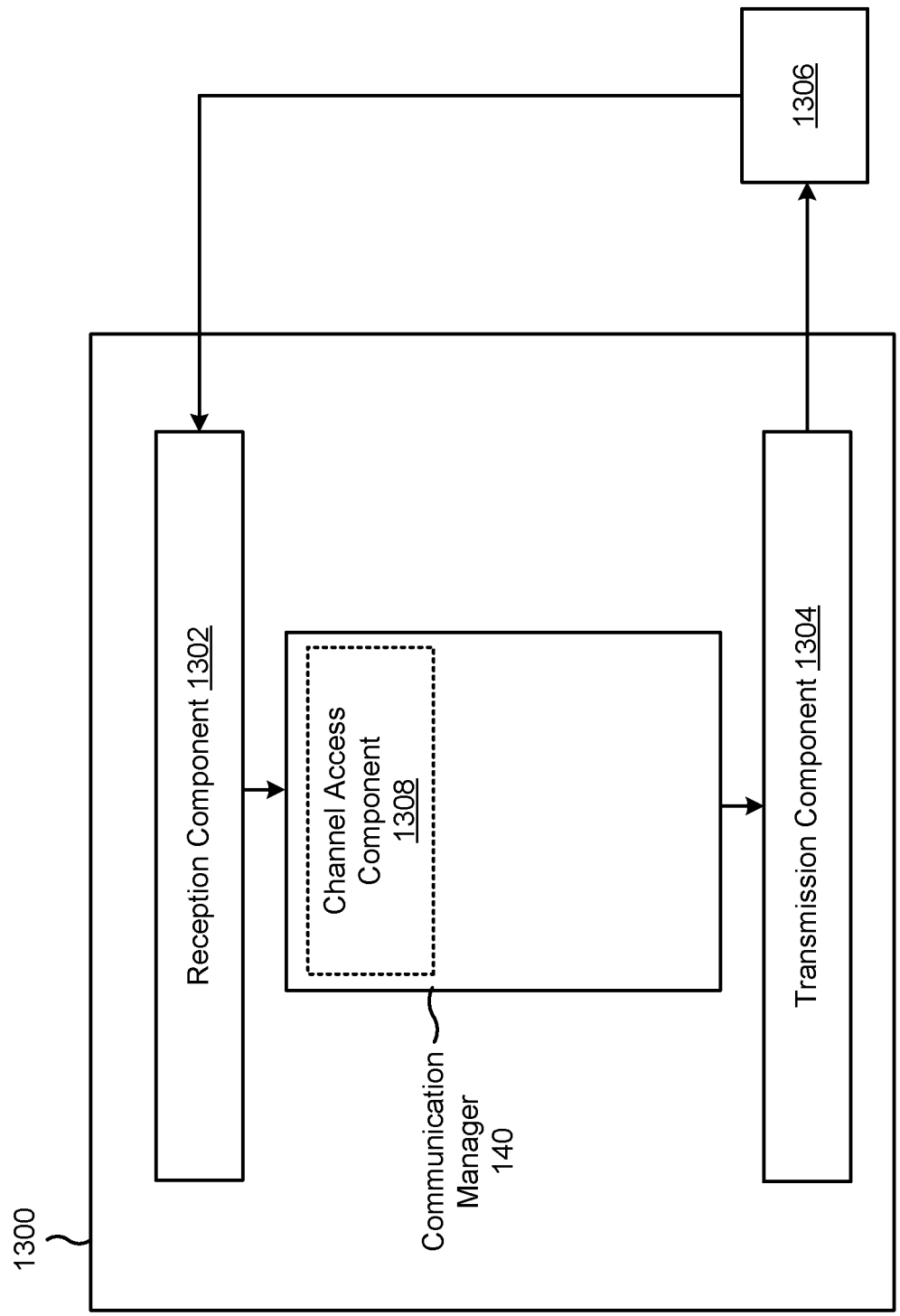
FIGS. 13-14 are diagrams of example apparatuses for wireless communication, in accordance with the present disclosure.

FIG. 13 is a diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include a channel access component 1308, among other examples.

In some aspects, the apparatus 1300 may be configured to perform one or more operations described herein in connection with FIGS. 6-10. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the UE described in connection with FIG. 2.

Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The reception component 1302 may receive an SSB transmitted using an SC-QAM waveform, wherein the SSB has a uniform bandwidth allocation for each of a PSS included in the SSB, an SSS included in the SSB, and PBCH data included in the SSB. The channel access component 1308 may perform initial channel access based at least in part on the SSB.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
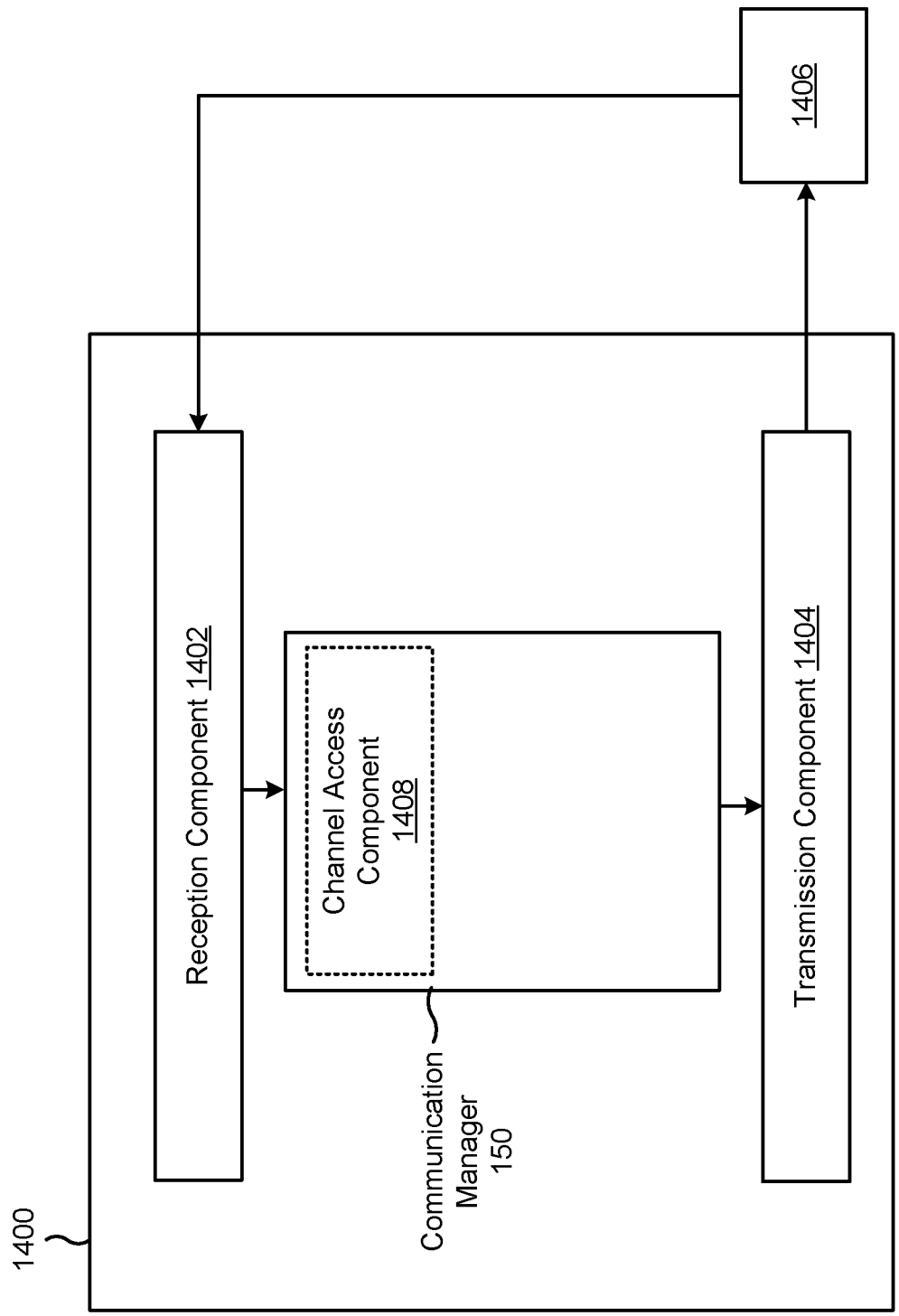

FIG. 14 is a diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 150. The communication manager 150 may include a channel access component 1408, among other examples.

In some aspects, the apparatus 1400 may be configured to perform one or more operations described herein in connection with FIGS. 6-10. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the base station described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a modem, a demodulator, a MIMO detector, a receive processor, a controller/processor, a memory, or a combination thereof, of the base station described in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the base station described in connection with FIG. 2. In some aspects, the transmission component 1404 may be co-located with the reception component 1402 in a transceiver.

The transmission component 1404 may transmit an SSB using an SC-QAM waveform, wherein the SSB has a uniform bandwidth allocation for each of a PSS included in the SSB, an SSS included in the SSB, and PBCH data included in the SSB. The channel access component 1408 may perform initial channel access based at least in part on the SSB.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: receiving a synchronization signal block (SSB) transmitted using a single carrier quadrature amplitude modulation (SC-QAM) waveform, wherein the SSB has a uniform bandwidth allocation for each of a primary synchronization signal (PSS) included in the SSB, a secondary synchronization signal (SSS) included in the SSB, and physical broadcast channel (PBCH) data included in the SSB; and performing initial channel access based at least in part on the SSB.

Aspect 2: The method of Aspect 1, wherein the SSS is used as a reference signal for at least one of channel estimation for the PBCH data or frequency error correction for the PBCH data.

Aspect 3: The method of any of Aspects 1-2, wherein the SSB has a uniform bandwidth allocation for the PSS, the SSS, the PBCH data, and a PBCH demodulation reference signal (DMRS) included in the SSB.

Aspect 4: The method of Aspect 3, wherein the SSS and the PBCH DMRS are used as reference signals for at least one of channel estimation for the PBCH data or frequency error correction for the PBCH data.

Aspect 5: The method of any of Aspects 1-4, wherein the SSB includes one symbol that includes the PSS, one symbol that includes the SSS, and four symbols that include the PBCH data.

Aspect 6: The method of Aspect 5, wherein the SSB includes at least one symbol that includes a PBCH demodulation reference signal.

Aspect 7: The method of any of Aspects 1-6, wherein a first-occurring symbol of the SSB includes the PSS, a second-occurring symbol of the SSB includes the SSS, and a third-occurring symbol, a fourth-occurring symbol, a fifth-occurring symbol, and a sixth-occurring symbol of the SSB include the PBCH data.

Aspect 8: The method of Aspect 7, wherein a seventh-occurring symbol of the SSB includes a PBCH demodulation reference signal.

Aspect 9: The method of any of Aspects 7-8, wherein each of the third-occurring symbol, the fourth-occurring symbol, the fifth-occurring symbol, and the sixth-occurring symbol of the SSB includes a corresponding PBCH demodulation reference signal (DMRS).

Aspect 10: The method of Aspect 9, wherein each corresponding PBCH DMRS is separated from PBCH data, in a corresponding symbol, by a gap.

Aspect 11: The method of any of Aspects 1-4, wherein the SSB includes one symbol that includes the PSS and the SSS, one symbol that includes a first portion of the PBCH data, and one symbol that includes a PBCH demodulation reference signal (DMRS) and a second portion of the PBCH data.

Aspect 12: The method of Aspect 11, wherein a first-occurring symbol of the SSB includes the PSS and the SSS, a second-occurring symbol of the SSB includes the first portion of the PBCH data, and a third-occurring symbol of the SSB includes the PBCH DMRS and the second portion of the PBCH data.

Aspect 13: The method of any of Aspects 1-4, wherein the SSB includes one symbol that includes the PSS, the SSS, and a first portion of the PBCH data, and wherein the SSB further includes one symbol that includes a PBCH demodulation reference signal (DMRS) and a second portion of the PBCH data.

Aspect 14: The method of Aspect 13, wherein a first-occurring symbol of the SSB includes the PSS, the SSS, and the first portion of the PBCH data, and a second-occurring symbol of the SSB includes the PBCH DMRS and the second portion of the PBCH data.

Aspect 15: The method of any of Aspects 1-4, wherein the SSB includes a single symbol that includes the PSS, the SSS, and the PBCH data.

Aspect 16: The method of Aspect 15, wherein the single symbol further includes a PBCH demodulation reference signal.

Aspect 17: The method of any of Aspects 1-16, wherein the PSS includes at least 127 resource elements, the SSS includes at least 127 resource elements, and the PBCH data includes at least 432 resource elements.

Aspect 18: A method of wireless communication performed by a base station, comprising: transmitting a synchronization signal block (SSB) using a single carrier quadrature amplitude modulation (SC-QAM) waveform, wherein the SSB has a uniform bandwidth allocation for each of a primary synchronization signal (PSS) included in the SSB, a secondary synchronization signal (SSS) included in the SSB, and physical broadcast channel (PBCH) data included in the SSB; and performing initial channel access based at least in part on the SSB.

Aspect 19: The method of Aspect 18, wherein the SSS is used as a reference signal for at least one of channel estimation for the PBCH data or frequency error correction for the PBCH data.

Aspect 20: The method of any of Aspects 18-19, wherein the SSB has a uniform bandwidth allocation for the PSS, the SSS, the PBCH data, and a PBCH demodulation reference signal (DMRS) included in the SSB.

Aspect 21: The method of Aspect 20, wherein the SSS and the PBCH DMRS are used as reference signals for at least one of channel estimation for the PBCH data or frequency error correction for the PBCH data.

Aspect 22: The method of any of Aspects 18-21, wherein the SSB includes one symbol that includes the PSS, one symbol that includes the SSS, and four symbols that include the PBCH data.

Aspect 23: The method of Aspect 22, wherein the SSB includes at least one symbol that includes a PBCH demodulation reference signal.

Aspect 24: The method of any of Aspects 18-23, wherein a first-occurring symbol of the SSB includes the PSS, a second-occurring symbol of the SSB includes the SSS, and a third-occurring symbol, a fourth-occurring symbol, a fifth-occurring symbol, and a sixth-occurring symbol of the SSB include the PBCH data.

Aspect 25: The method of Aspect 24, wherein a seventh-occurring symbol of the SSB includes a PBCH demodulation reference signal.

Aspect 26: The method of any of Aspects 24-25, wherein each of the third-occurring symbol, the fourth-occurring symbol, the fifth-occurring symbol, and the sixth-occurring symbol of the SSB includes a corresponding PBCH demodulation reference signal (DMRS).

Aspect 27: The method of Aspect 26, wherein each corresponding PBCH DMRS is separated from PBCH data, in a corresponding symbol, by a gap.

Aspect 28: The method of any of Aspects 18-21, wherein the SSB includes one symbol that includes the PSS and the SSS, one symbol that includes a first portion of the PBCH data, and one symbol that includes a PBCH demodulation reference signal (DMRS) and a second portion of the PBCH data.

Aspect 29: The method of Aspect 28, wherein a first-occurring symbol of the SSB includes the PSS and the SSS, a second-occurring symbol of the SSB includes the first portion of the PBCH data, and a third-occurring symbol of the SSB includes the PBCH DMRS and the second portion of the PBCH data.

Aspect 30: The method of any of Aspects 18-21, wherein the SSB includes one symbol that includes the PSS, the SSS, and a first portion of the PBCH data, and wherein the SSB further includes one symbol that includes a PBCH demodulation reference signal (DMRS) and a second portion of the PBCH data.

Aspect 31: The method of Aspect 30, wherein a first-occurring symbol of the SSB includes the PSS, the SSS, and the first portion of the PBCH data, and a second-occurring symbol of the SSB includes the PBCH DMRS and the second portion of the PBCH data.

Aspect 32: The method of any of Aspects 18-21, wherein the SSB includes a single symbol that includes the PSS, the SSS, and the PBCH data.

Aspect 33: The method of Aspect 32, wherein the single symbol further includes a PBCH demodulation reference signal.

Aspect 34: The method of any of Aspects 18-33, wherein the PSS includes at least 127 resource elements, the SSS includes at least 127 resource elements, and the PBCH data includes at least 432 resource elements.

Aspect 35: An apparatus for wireless communication at a device, comprising a processor; memory coupled with the processor; and instructions stored in the memory and executable by the processor to cause the apparatus to perform the method of one or more of Aspects 1-17.

Aspect 36: A device for wireless communication, comprising a memory and one or more processors coupled to the memory, the one or more processors configured to perform the method of one or more of Aspects 1-17.

Aspect 37: An apparatus for wireless communication, comprising at least one means for performing the method of one or more of Aspects 1-17.

Aspect 38: A non-transitory computer-readable medium storing code for wireless communication, the code comprising instructions executable by a processor to perform the method of one or more of Aspects 1-17.

Aspect 39: A non-transitory computer-readable medium storing a set of instructions for wireless communication, the set of instructions comprising one or more instructions that, when executed by one or more processors of a device, cause the device to perform the method of one or more of Aspects 1-17.

Aspect 40: An apparatus for wireless communication at a device, comprising a processor; memory coupled with the processor; and instructions stored in the memory and executable by the processor to cause the apparatus to perform the method of one or more of Aspects 18-34.

Aspect 41: A device for wireless communication, comprising a memory and one or more processors coupled to the memory, the one or more processors configured to perform the method of one or more of Aspects 18-34.

Aspect 42: An apparatus for wireless communication, comprising at least one means for performing the method of one or more of Aspects 18-34.

Aspect 43: A non-transitory computer-readable medium storing code for wireless communication, the code comprising instructions executable by a processor to perform the method of one or more of Aspects 18-34.

Aspect 44: A non-transitory computer-readable medium storing a set of instructions for wireless communication, the set of instructions comprising one or more instructions that, when executed by one or more processors of a device, cause the device to perform the method of one or more of Aspects 18-34.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
receive a synchronization signal block (SSB) transmitted using a single carrier quadrature amplitude modulation (SC-QAM) waveform, wherein:
the SSB has a uniform bandwidth allocation for each of a primary synchronization signal (PSS) included in the SSB, a secondary synchronization signal (SSS) included in the SSB, and physical broadcast channel (PBCH) data included in the SSB; and
the SSB includes one symbol that includes a first portion of the PBCH data, and one symbol that includes a PBCH demodulation reference signal (DMRS) and a second portion of the PBCH data; and
perform initial channel access based at least in part on the SSB.

2. The UE of claim 1, wherein the SSS is used as a reference signal for at least one of channel estimation for the PBCH data or frequency error correction for the PBCH data.

3. The UE of claim 1, wherein the SSB has a uniform bandwidth allocation for the PSS, the SSS, the PBCH data, and the PBCH DMRS included in the SSB.

4. The UE of claim 1, wherein the SSB includes one symbol that includes the PSS, one symbol that includes the SSS, and four symbols that include the PBCH data.

5. The UE of claim 1, wherein a first-occurring symbol of the SSB includes the PSS, a second-occurring symbol of the SSB includes the SSS, and a third-occurring symbol, a fourth-occurring symbol, a fifth-occurring symbol, and a sixth-occurring symbol of the SSB include the PBCH data.

6. The UE of claim 5, wherein a seventh-occurring symbol of the SSB includes a second PBCH DMRS.

7. The UE of claim 5, wherein each of the third-occurring symbol, the fourth-occurring symbol, the fifth-occurring symbol, and the sixth-occurring symbol of the SSB includes a corresponding PBCH DMRS.

8. The UE of claim 7, wherein each corresponding PBCH DMRS is separated from PBCH data, in a corresponding symbol, by a gap.

9. The UE of claim 1, wherein the SSB further includes one symbol that includes the PSS and the SSS.

10. The UE of claim 9, wherein a first-occurring symbol of the SSB includes the PSS and the SSS, a second-occurring symbol of the SSB includes the first portion of the PBCH data, and a third-occurring symbol of the SSB includes the PBCH DMRS and the second portion of the PBCH data.

11. The UE of claim 1, wherein the SSB includes one symbol that includes the PSS, the SSS, and the first portion of the PBCH data.

12. The UE of claim 11, wherein a first-occurring symbol of the SSB includes the PSS, the SSS, and the first portion of the PBCH data, and a second-occurring symbol of the SSB includes the PBCH DMRS and the second portion of the PBCH data.

13. The UE of claim 1, wherein the SSB includes a symbol that includes the PSS, the SSS, and the second portion of the PBCH data.

14. The UE of claim 13, wherein the symbol further includes the PBCH DMRS.

15. A base station for wireless communication, comprising:
a memory; and
one or more processors, coupled to the memory, configured to:
transmit a synchronization signal block (SSB) using a single carrier quadrature amplitude modulation (SC-QAM) waveform, wherein:
the SSB has a uniform bandwidth allocation for each of a primary synchronization signal (PSS) included in the SSB, a secondary synchronization signal (SSS) included in the SSB, and physical broadcast channel (PBCH) data included in the SSB; and
the SSB includes one symbol that includes a first portion of the PBCH data, and one symbol that includes a PBCH demodulation reference signal (DMRS) and a second portion of the PBCH data; and
perform initial channel access based at least in part on the SSB.

16. The base station of claim 15, wherein the SSB has a uniform bandwidth allocation for the PSS, the SSS, the PBCH data, and the PBCH DMRS included in the SSB.

17. The base station of claim 15, wherein the SSB includes one symbol that includes the PSS, one symbol that includes the SSS, and four symbols that include the PBCH data.

18. The base station of claim 15, wherein the SSB includes one symbol that includes the PSS and the SSS.

19. The base station of claim 15, wherein the SSB includes one symbol that includes the PSS, the SSS, and the first portion of the PBCH data.

20. The base station of claim 15, wherein the SSB includes a symbol that includes the PSS, the SSS, and the second portion of the PBCH data.

21. A method of wireless communication performed by a user equipment (UE), comprising:
- receiving a synchronization signal block (SSB) transmitted using a single carrier quadrature amplitude modulation (SC-QAM) waveform, wherein:
  - the SSB has a uniform bandwidth allocation for each of a primary synchronization signal (PSS) included in the SSB, a secondary synchronization signal (SSS) included in the SSB, and physical broadcast channel (PBCH) data included in the SSB; and
  - the SSB includes one symbol that includes a first portion of the PBCH data, and one symbol that includes a PBCH demodulation reference signal (DMRS) and a second portion of the PBCH data; and
- performing initial channel access based at least in part on the SSB.

22. The method of claim 21, wherein the SSS is used as a reference signal for at least one of channel estimation for the PBCH data or frequency error correction for the PBCH data.

23. The method of claim 21, wherein the SSB has a uniform bandwidth allocation for the PSS, the SSS, the PBCH data, and the PBCH DMRS included in the SSB.

24. The method of claim 21, wherein the SSB includes one symbol that includes the PSS, one symbol that includes the SSS, and four symbols that include the PBCH data.

25. The method of claim 21, wherein the SSB further includes one symbol that includes the PSS and the SSS.

26. The method of claim 21, wherein the SSB includes one symbol that includes the PSS, the SSS, and the first portion of the PBCH data.

27. The method of claim 21, wherein the SSB includes a symbol that includes the PSS, the SSS, and the second portion of the PBCH data.

28. The method of claim 21, wherein a first-occurring symbol of the SSB includes the PSS, a second-occurring symbol of the SSB includes the SSS, and a third-occurring symbol, a fourth-occurring symbol, a fifth-occurring symbol, and a sixth-occurring symbol of the SSB include the PBCH data.

29. A method of wireless communication performed by a base station, comprising:
- transmitting a synchronization signal block (SSB) using a single carrier quadrature amplitude modulation (SC-QAM) waveform, wherein:
  - the SSB has a uniform bandwidth allocation for each of a primary synchronization signal (PSS) included in the SSB, a secondary synchronization signal (SSS) included in the SSB, and physical broadcast channel (PBCH) data included in the SSB; and
  - the SSB includes one symbol that includes a first portion of the PBCH data, and one symbol that includes a PBCH demodulation reference signal (DMRS) and a second portion of the PBCH data; and
- performing initial channel access based at least in part on the SSB.

30. The method of claim 29, wherein the SSB has a uniform bandwidth allocation for the PSS, the SSS, the PBCH data, and the PBCH DMRS included in the SSB.

* * * * *